(12) United States Patent
Tanaka et al.

(10) Patent No.: US 6,388,354 B1
(45) Date of Patent: *May 14, 2002

(54) MOTOR FOR AN ELECTRIC POWER STEERING ASSEMBLY

(75) Inventors: Toshinori Tanaka; Ryuichi Ikeda; Shigekazu Sakabe; Akihiro Daikoku; Akihiko Imagi; Yoshio Yoshikuwa; Kyouhei Yamamoto, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,344

(22) Filed: May 18, 1999

(30) Foreign Application Priority Data

Jun. 29, 1998 (JP) .......................................... 10-182487
Jan. 20, 1999 (JP) .......................................... 11-012017

(51) Int. Cl.$^7$ ................................................ H02K 3/00
(52) U.S. Cl. ........................ 310/179; 310/233; 310/206
(58) Field of Search .......................... 310/179, 46, 154, 310/233, 40 MM, 264, 206, 195

(56) References Cited

U.S. PATENT DOCUMENTS

| | | | | |
|---|---|---|---|---|
| 3,445,703 A | * | 5/1969 | Snively | 310/204 |
| 3,557,325 A | * | 1/1971 | Hansen | 200/19.07 |
| 4,598,222 A | * | 7/1986 | Matsunaga et al. | 310/198 |
| 5,202,599 A | * | 4/1993 | Kao | 310/234 |
| 5,210,928 A | * | 5/1993 | Seshita et al. | 29/596 |
| 5,742,111 A | * | 4/1998 | Reed | 310/236 |

FOREIGN PATENT DOCUMENTS

| | | | | |
|---|---|---|---|---|
| JP | 52-156306 | | 12/1977 | |
| JP | 60-162451 | | 8/1985 | |
| JP | 3011963 | * | 1/1991 | H02K/23/30 |

* cited by examiner

Primary Examiner—Joseph Waks
(74) Attorney, Agent, or Firm—Sughrue, Mion, Zinn, Macpeak & Seas, PLLC

(57) ABSTRACT

A motor for an electric power steering assembly includes a yoke, a multi-polar magnetic field portion composed of at least four poles secured to the inner wall of the yoke, a shaft disposed within the yoke so as to be able to rotate freely, an armature secured to the shaft having a winding constructed by winding wiring into an even number of slots formed on the outer circumferential surface of a core so as to extend in the axial direction thereof, a commutator including a plurality of segments secured to an end portion of the shaft; and a plurality of brushes contacting the surface of the commutator.

5 Claims, 28 Drawing Sheets

FIG. 25

| Number of Poles | Number of Slots | Class of Number of Slots | | | Torque Ripples (%) | Radial Force (N) |
|---|---|---|---|---|---|---|
| | | Even | Multiple of Number of Pairs of Poles | Multiple of Number of Poles | | |
| 4 | 20 | ○ | ○ | ○ | 11.1 | 0 |
| 4 | 21 | × | × | × | 0.096 | 1.79 |
| 4 | 22 | ○ | ○ | × | 0.876 | 0 |
| 4 | 24 | ○ | ○ | ○ | 7.12 | 0 |
| 4 | 26 | ○ | ○ | × | 0.846 | 0 |
| 4 | 28 | ○ | ○ | ○ | 3.37 | 0 |

FIG. 32

| Number of Poles | Number of Slots | Class of Number of Slots | | | Torque Ripples (%) | Radial Force (N) |
|---|---|---|---|---|---|---|
| | | Even | Multiple of Number of Pairs of Poles | Multiple of Number of Poles | | |
| 6 | 21 | X | ◯ | X | 1.76 | 0 |
| 6 | 22 | ◯ | X | X | 1.26 | 0 |
| 6 | 24 | ◯ | ◯ | ◯ | 8.64 | 0 |
| 6 | 25 | X | X | X | 0.327 | 2.65 |
| 6 | 26 | ◯ | ◯ | X | 0.942 | 0 |
| 6 | 27 | X | ◯ | X | 1.2 | 0 |

MOTOR FOR AN ELECTRIC POWER STEERING ASSEMBLY

BACKGROUND OF THE INVENTION

1. Field of the Invention

The present invention relates to a motor for an electric power steering assembly for assisting the steering force of an automotive steering wheel.

2. Description of the Related Art

FIG. 15 is a cross-section of a conventional motor for an electric power steering assembly (hereinafter "electric motor") 100. The electric motor 100 comprises: a cylindrical yoke 1; two permanent field magnets 2 arranged circumferentially and secured so as to face each other inside the yoke 1; a shaft 4 disposed inside the yoke 1 by means of bearings 3 so as to be able to rotate freely; an armature 5 secured to the shaft 4; a commutator 6 comprising a plurality of copper segments 16 secured to an end portion of the shaft 4; and brushes 8 placed in contact with the surface of the commutator 6 by the elastic force of springs 7.

The armature 5 comprises: a core 9 having a plurality of slots 11 extending in the axial direction; and a winding 10 constructed by winding wiring into the slots 11 by a lap winding method.

In the above 2-pole lap-wound electric motor 100, an electric current is supplied to the winding 10 from outside by means of the brushes 8 contacting the segments 16, whereby the armature 5 rotates together with the shaft 4 due to electromagnetic action.

Since the above electric motor 100 is mainly used in relatively light-weight low-capacity automobiles, the assisting torque from the electric motor 100 is small and consequently the operating noise of the electric motor 100 is extremely small—so small that it is practically unnoticeable inside the automobile.

However, now that fuel-conservation and weight reduction are required even in heavy-weight middle- and high-capacity automobiles due to public demand for fuel efficiency, reduced exhaust emissions, etc., direct-current motor power steering assemblies are starting to replace hydraulic power steering assemblies. Electric motors providing large torque are required in such cases, but since 2-pole lap-wound designs result in large-bodied motors, it is necessary to increase the number of poles to four or so to reduce size and produce high torque.

FIGS. 16 and 17 show comparisons between a 2-pole 14-slot direct-current motor (hereinafter "2-pole motor") and a 4-pole 21-slot direct-current motor (hereinafter "4-pole motor") given as an example of a multipolar machine. These figures show the differences in magnetic attraction acting on the armatures in 2-pole and 4-pole motors when the armatures are off center and were obtained by magnetic field analysis by the present inventors. In FIG. 16, "•" represents the center of the stator, that is, the original center of rotation, and "X" represents the center of rotation when off center. In FIG. 17, → represents the force of eccentricity direction, → represents the force of right angle thereof. As can be seen from the figure, vibrations and noise are generated more easily in a 4-pole motor than in a 2-pole motor.

That is, when the forces acting on the armatures were examined with each being placed off center by the same amount (0.1 mm) from the original central position in every angle of eccentricity from 0 degrees to 360 degrees, the maximum magnetic attraction acting in the direction of eccentricity in the 4-pole motor was approximately 2.7 N, or six times the maximum magnetic attraction acting in the direction of eccentricity in the 2-pole motor which was approximately 0.45 N. In the 2-pole motor, the direction of magnetic attraction due to eccentricity can be clearly seen, and when the force acting is compared to the angle of eccentricity it is found that when the eccentricity is between the poles (an angle of eccentricity of 90 degrees or 270 degrees) approximately twice as much magnetic attraction (0.45/0.21) acts as when the eccentricity is directed towards the center of a pole (an angle of eccentricity of 0 degrees or 180 degrees). In the 4-pole motor, on the other hand, no clear direction can be seen. That is, the force in the direction of eccentricity is approximately 2.7 N for every angle of eccentricity from 0 degrees to 360 degrees, which means that there is a direction of stability with respect to eccentricity in a 2-pole motor, but no such direction exists in a 4-pole motor, and this difference can be considered to be related to the differences in vibration and noise.

Thus, it is necessary to increase the number of poles to four or so in order to reduce size and produce high torque, but problems of vibration and noise remain.

Now, apart from lap winding, wave winding may also be considered as a winding method for armatures when the number of poles is increased in order to reduce size and increase torque. With a lap winding, the number of brushes provided is generally the same as the number of poles, but with a wave winding two brushes are generally provided.

FIGS. 18 and 19 are sets of diagrams and graphs showing the magnetic attraction acting on a 4-pole 21-slot armature given as an multi-polar example, FIG. 18 showing a case with a lap winding and four brushes and FIG. 19 showing a case with a wave winding and two brushes. In FIGS. 18 and 19, "●" represents 100% current flows perpendicular to the paper in an upward direction, ⊙ represents 100% current flows perpendicular to the paper in an downward direction, ⊕ represents 50% current flows perpendicular to the paper in an downward direction, ⬥ represents 50% current flows perpendicular to the paper in an upward direction, and "⊙" represents current does not flow.

Comparing the two figures, we see that whereas in the case of wave winding the magnetic attraction acting on the armature as the armature turns by one slot of the core is always directed in a given radially-outward direction as indicated by the arrow A, in the case of a lap-wound 21-slot armature, the magnetic attraction moves circumferentially as indicated by the arrow B, and one problem with a lap-wound 21-slot armature is that rotational vibrations arise easily, making the generation of operating noise that much more likely.

In the case of a multi-polar odd numbered-slot lap winding, another problem is that differences arise in the electromotive forces induced among the circuits of the winding of the armature due to the influences of imbalances in the electromagnetic circuit of the yoke, eccentricities in the armature, nonuniform electric currents flowing through the brushes, engineering errors, etc., giving rise to circulating currents within the armature flowing through the brushes, and as a result the commutating action of the brushes deteriorates, leading to increases in temperature, shortened working life, increases in torque ripples in the brushes and the commutator which accompany an increase in commutation sparks generated by the brushes, as well as the combined effects thereof, thereby increasing operating noise.

At the same time, in the case of a multi-pole odd numbered-slot wave winding, there are problems such as torque ripples increasing in magnitude and workability deteriorating due to increased thickness of the winding in order to reduce the number of parallel circuits, etc.

SUMMARY OF THE INVENTION

The present invention aims to solve the above problems and an object of the present invention is to provide a motor for an electric power steering assembly enabling reduced operating noise.

In order to achieve the above object, according to one aspect of the present invention, there is provided a motor for an electric power steering assembly comprising: a yoke; a multi-polar magnetic field portion composed of at least four poles secured to the inner wall of the yoke; a shaft disposed within the yoke so as to be able to rotate freely; an armature secured to the shaft having a winding constructed by lap winding wiring into an even number of slots formed on the outer circumferential surface of a core so as to extend in the axial direction thereof; a commutator comprising a plurality of segments secured to an end portion of the shaft; and a plurality of brushes contacting the surface of the commutator.

According to one form of the present invention, there is provided a motor for an electric power steering assembly wherein the number of slots is even and is not a multiple of the number of poles.

According to another aspect of the present invention, there is provided a motor for an electric power steering assembly comprising: a yoke; a multi-polar magnetic field portion composed of at least four poles secured to the inner wall of the yoke; a shaft disposed within the yoke so as to be able to rotate freely; an armature secured to the shaft having a winding constructed by lap winding wiring into a number of slots being a multiple of the number of pairs of poles, the slots being formed on the outer circumferential surface of a core so as to extend in the axial direction thereof; a commutator comprising a plurality of segments secured to an end portion of the shaft; and a plurality of brushes contacting the surface of the commutator.

According to one form of the present invention, there is provided a motor for an electric power steering assembly wherein the number of slots is a multiple of the number of pairs of poles and is not a multiple of the number of poles.

According to another form of the present invention, there is provided a motor for an electric power steering assembly comprising equalizing members for preventing circulating currents from flowing through the brushes due to differences in induced electromotive forces arising between circuits within the circuits of the armature.

According to still another form of the present invention, there is provided a motor for an electric power steering assembly wherein $Ns/(n \times 2) \leq K \leq Ns$, where K is the number of equalizing members, Ns is the number of slots in the core, and n is the maximum number of segments covered by the brushes.

According to one form of the present invention, there is provided a motor for an electric power steering assembly wherein the current passing through the winding is controlled by pulse width modulation (PWM) driving.

According to another form of the present invention, there is provided a motor for an electric power steering assembly wherein the wiring is enamel-coated round wire.

According to still another form of the present invention, there is provided a motor for an electric power steering assembly wherein the magnetic field portion comprises a plurality of permanent magnets disposed so as to be spaced around the inner wall of the yoke.

BRIEF DESCRIPTION OF THE DRAWINGS

FIG. 25 is a table showing the relationship between torque ripples and magnetic attraction in 4-pole lap-wound 20-, 21-, 22-, 24-, 26-, and 28-slot 4-brush motors for electric power steering assemblies;

FIG. 32 is a table showing the relationship between torque ripples and magnetic attraction in 6-pole lap-wound 21-, 22-, 24-, 25-, 26-, and 27-slot 6-brush motors for electric power steering assemblies.

DETAILED DESCRIPTION OF THE PREFERRED EMBODIMENT

EMBODIMENT 1

An example of a motor for an electric power steering assembly (hereinafter "electric motor") according to the present invention will now be explained, and parts the same as or corresponding to those of the conventional example will be given the same numbering.

Figure 1:
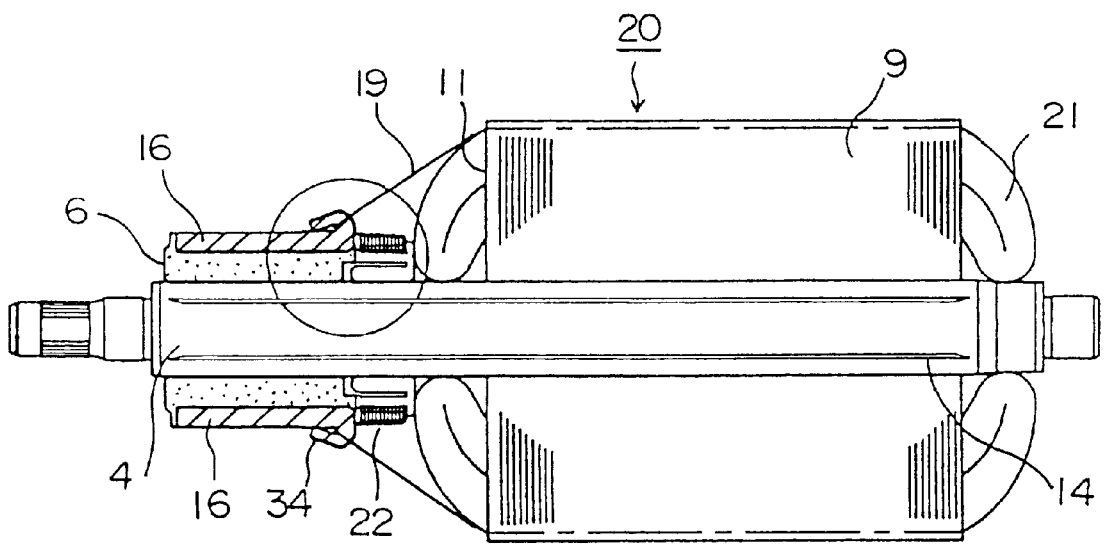
FIG. 1 is a partial cross-section of a motor for an electric power steering assembly according to Embodiment 1 of the present invention.
Figure 2:
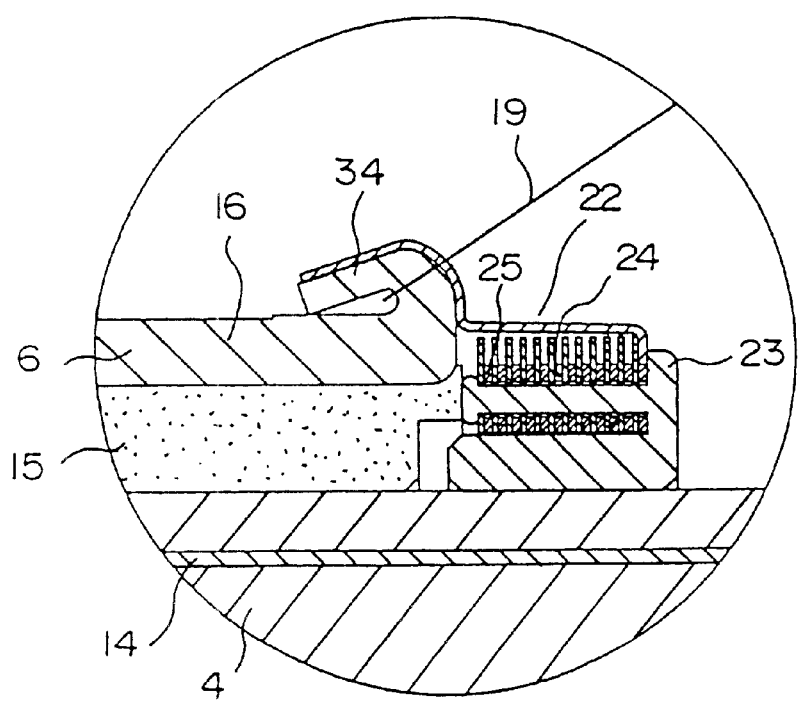
FIG. 2 is an enlargement of part of FIG. 1.

FIG. 1 is a cross-section of the internal construction of an electric motor according to Embodiment 1 of the present invention, and FIG. 2 is an enlargement of part of FIG. 1. The electric motor comprises: a cylindrical yoke 1; four permanent magnets 2 composed of ferrite spaced circumferentially and secured inside the yoke 1; a shaft 4 disposed inside the yoke 1 by means of bearings 3 so as to be able to rotate freely; an armature 20 secured to the shaft 4; a commutator 6 comprising a plurality of segments 16 secured to an end portion of the shaft 4; four brushes 8 spaced equidistantly and placed in contact with the surface of the commutator 6 by the elastic force of springs 7; and an equalizer main body 22 secured to the shaft 4 between the armature 20 and the commutator 6. Moreover, the yoke 1, permanent magnets 2, bearings 3, springs 7, and brush 8 are not shown in these figures.

The armature 20 comprises: a core 9 having twenty-four slots 11 extending in the axial direction; and a winding 21 constructed by winding wiring 19 into the slots 11 by a lap winding method.

Figure 3A:
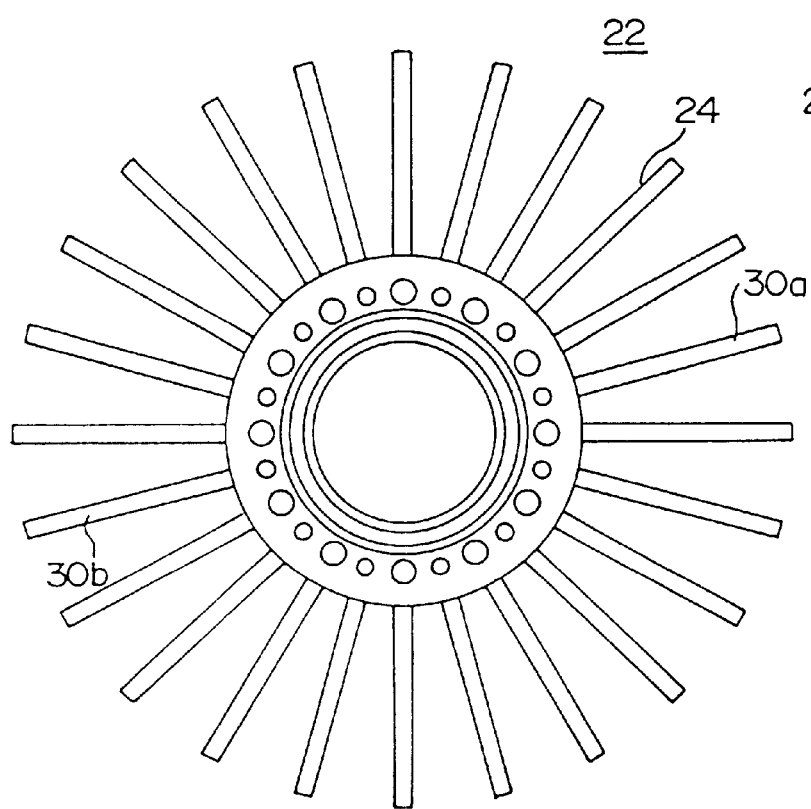
FIG. 3(a) is a developed front elevation of the equalizer main body in FIG. 1.
Figure 3B:
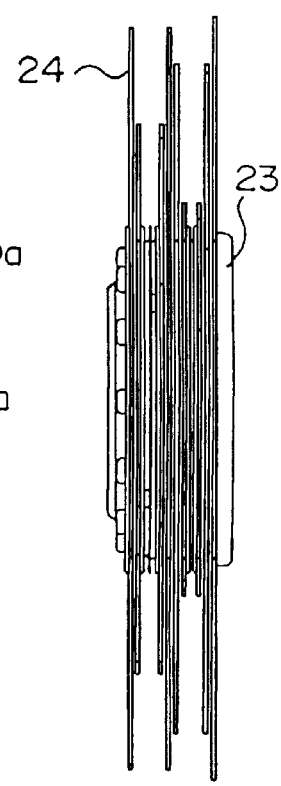
FIG. 3(b) is a side elevation of FIG. 3(a)

FIG. 3(a) is a developed front elevation of the equalizer main body 22, and FIG. 3(b) is a side elevation of the equalizer main body 22 in FIG. 3(a). The equalizer main body 22 comprises: twelve terminals 24 composed of copper plate, etc., which are equalizing members; and twelve insulating plates 25, alternately stacked in layers on a base 23.

Figure 4A:
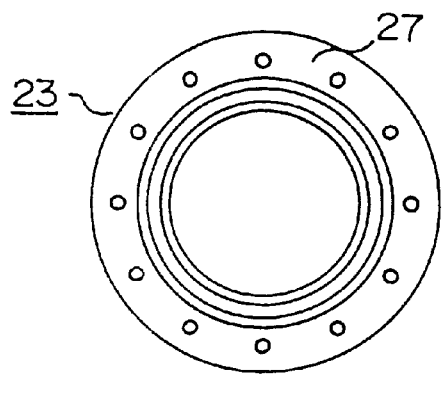
FIG. 4(a) is a front elevation of the base of the equalizer main body in FIG. 1.
Figure 4B:
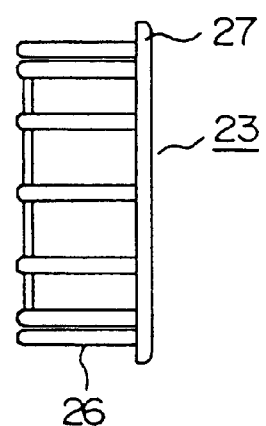
FIG. 4(b) is a side elevation of FIG. 4(a)

FIGS. 4(a) and 4(b) are a front elevation and a side elevation, respectively, of the base 23. Twelve pins 26 are arranged so as to stand equidistantly around the circumference of a toric base main body 27.

Figure 5:
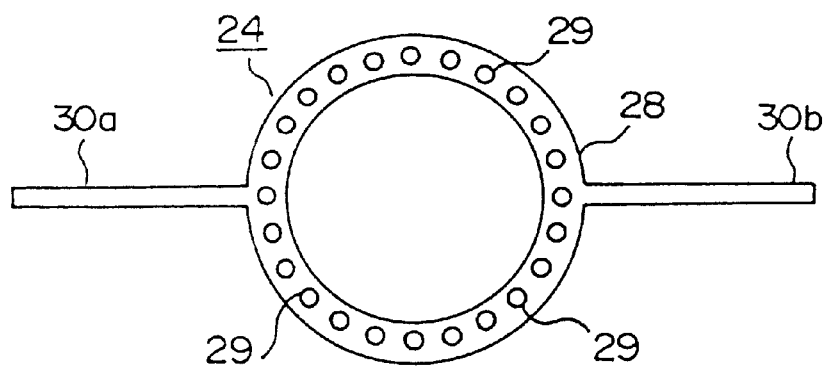
FIG. 5 is a front elevation of a terminal of the equalizer main body in FIG. 1.

FIG. 5 is a front elevation of a terminal 24 being an equalizing member. Apertures 29 are formed at 24 points spaced equidistantly around the circumference of the annular terminal main body 28 of each of the terminals 24 being equalizing members. Furthermore, equalizer lead portions 30a, 30b extending radially outwards in opposite directions are disposed on the terminal main body 28.

Figure 6:
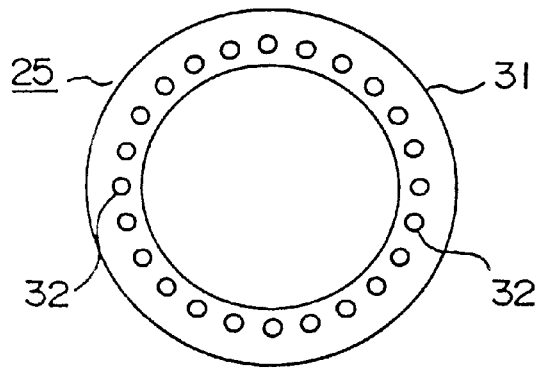
FIG. 6 is a front elevation of an insulating plate of the equalizer main body in FIG. 1.

FIG. 6 is a front elevation of an insulating plate 25. Apertures 32 are formed at 24 points spaced equidistantly around the circumference of the annular insulating plate main body 31 of each of the insulating plates 25.

In the above electric motor, the equalizer main body 22 is assembled by alternately stacking the twelve terminals 24 and the twelve insulating plates 25 on the base 23. During this process, each successive terminal 24 is rotated by 15 degrees and the terminals 24 are secured to the base 23 by passing the pins 26 of the base 23 through the apertures 29 in the terminals 24. Furthermore, the insulating plates 25 are secured to the base 23 by passing the pins 26 of the base 23 through the apertures 32 in the insulating plates 25. Then, the equalizer main body 22 is integrated by crimping the ends of the pins 26.

Next, the equalizer main body 22 and the commutator 6 are fitted onto the shaft 4 in that order. Protrusions 14 extending in the axial direction are formed on the shaft 4 in order to position the equalizer main body 22 and the commutator 6 relative to the direction of rotation, and the base 23 and the commutator main body 15, which are both composed of phenol resin, are secured to the protrusions 14 by elastic deformation.

Next, the armature 20 is formed by bending the equalizer lead portions 30a, 30b to align with hooks 34, and forming the winding 21 by winding the wiring 19 onto the core 9 by a lap winding method, then the equalizer lead portions 30a, 30b and the hooks 34 are electrically connected at twenty-four points by simultaneous fusion or the like.

Figure 18:
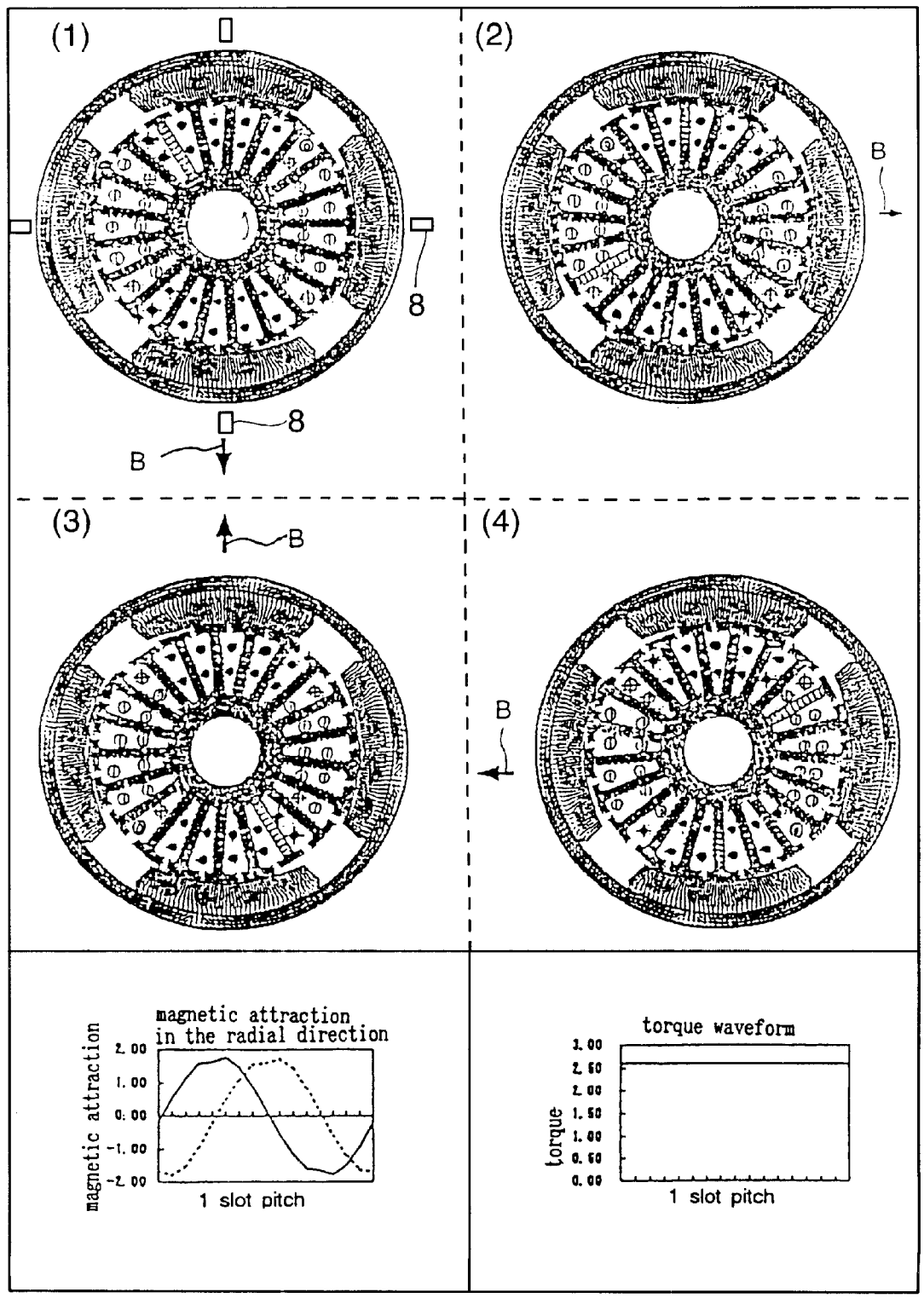
FIG. 18 is a set of diagrams and graphs explaining magnetic attraction and torque ripples in a 4-pole lap-wound 21-slot 4-brush motor for an electric power steering assembly.
Figure 21:
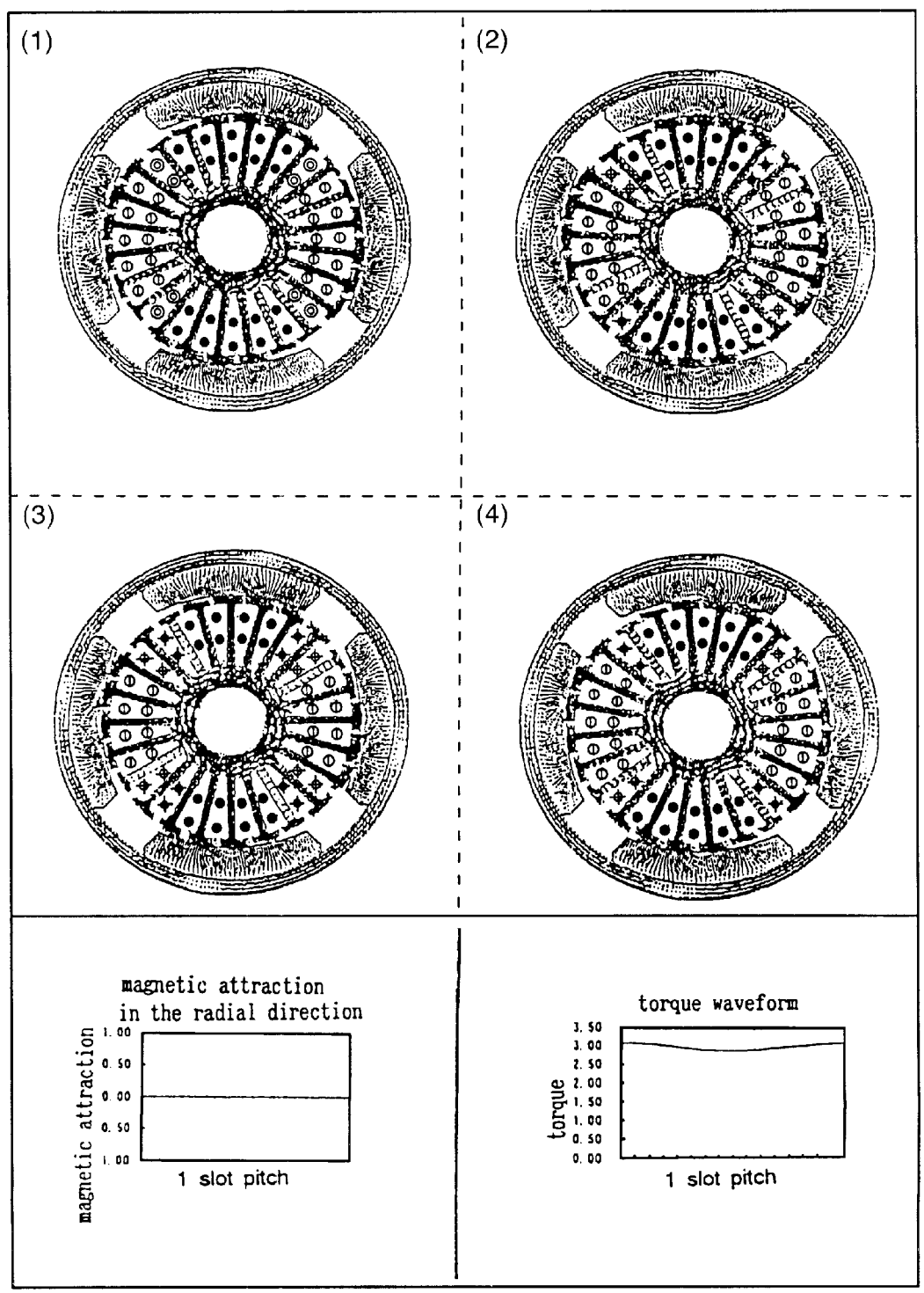
FIG. 21 is a set of diagrams and graphs explaining magnetic attraction and torque ripples in a 4-pole lap-wound 24-slot 4-brush motor for an electric power steering assembly.

An electric motor of the above construction has four magnetic poles, twenty-four slots 11, a lap winding, and a 4-brush system. FIG. 21 is a set of diagrams and graphs of magnetic attraction and torque ripples acting on the armature 20 in the above motor which the present inventors obtained by magnetic field analysis. Whereas in the case of the 4-pole lap-wound 4-brush, 21-slot armature of FIG. 18 described above, the magnetic attraction acting on the armature moves circumferentially and rotational vibrations arise easily, making the generation of operating noise that much more likely, it is clear that in the case of a 24-slot lap-wound armature, the total magnetic attraction acting on the armature is zero and that operating noise therefore does not arise due to rotational vibrations.

Figure 7:
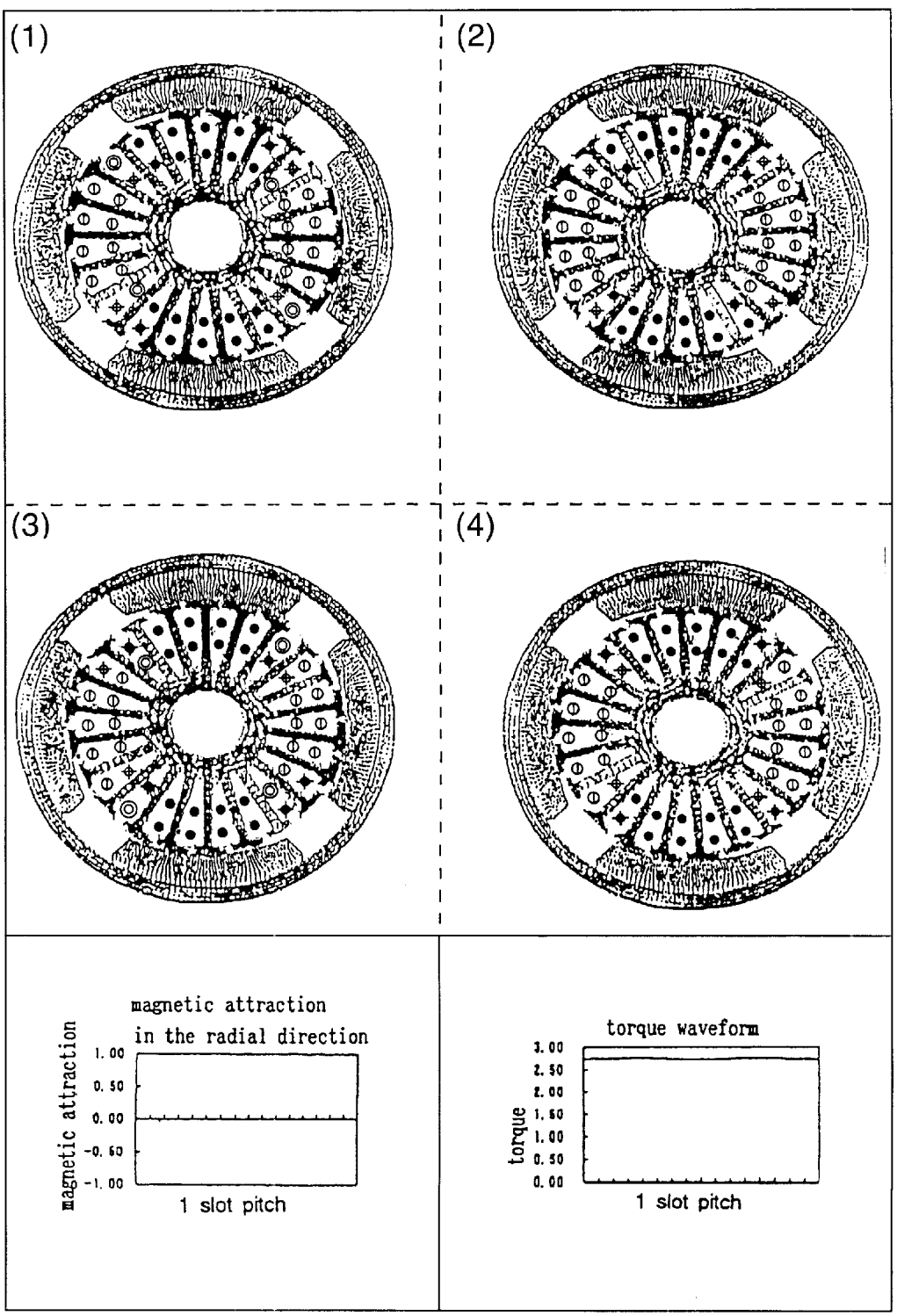
FIG. 7 is a set of diagrams and graphs explaining magnetic attraction acting on an armature having four poles, a lap winding, four brushes, and twenty-two slots.

FIG. 7 is a set of diagrams and graphs of magnetic attraction and torque ripples acting on an armature having four poles, a lap winding, and an even numbered twenty-two slots which the present inventors obtained by magnetic field analysis.

As can be seen from the figure, in the case of a 22-slot lap-wound armature, the total magnetic attraction acting on the armature is also zero and operating noise therefore does not arise due to rotational vibrations.

Figure 19:
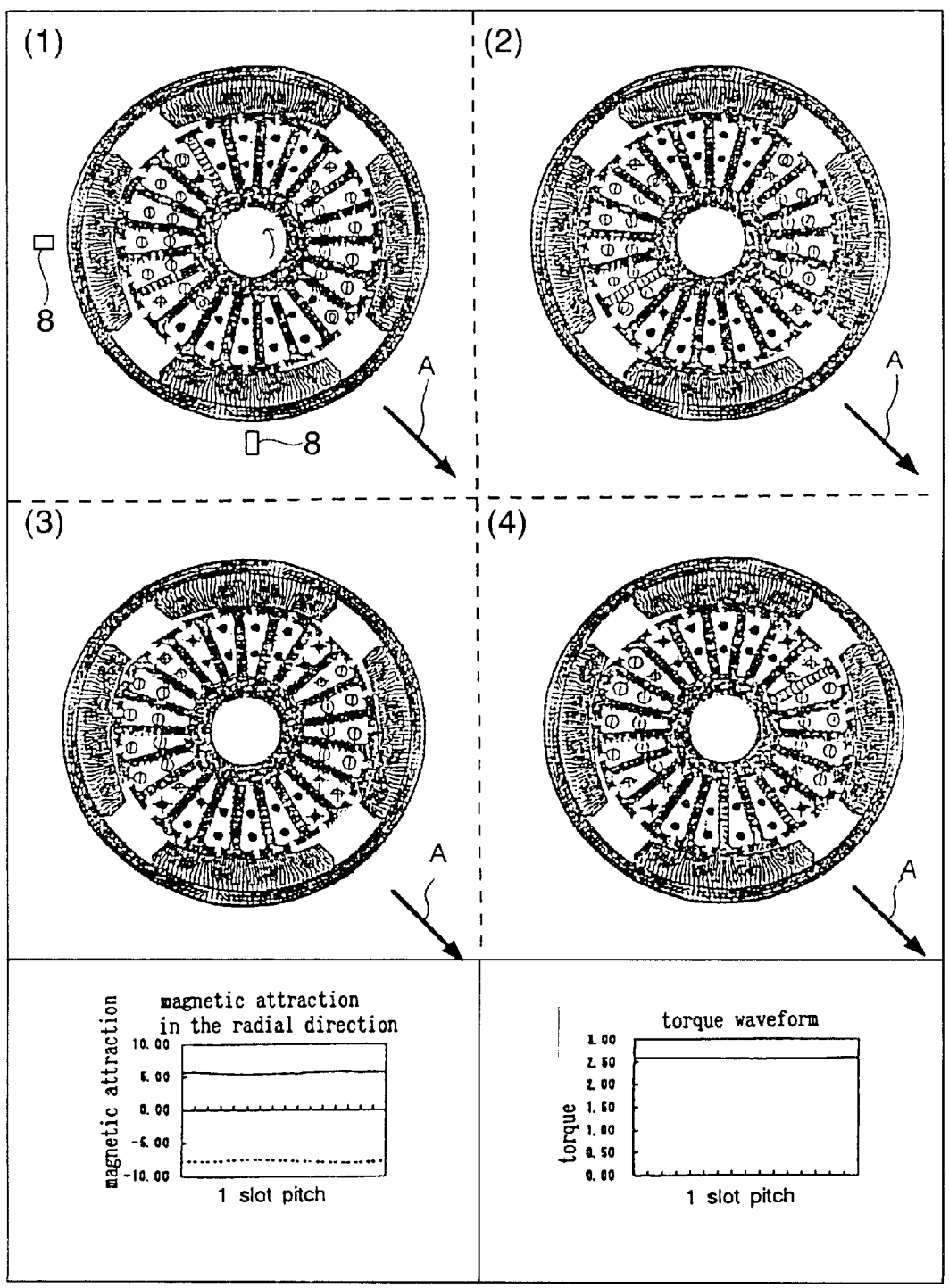
FIG. 19 is a set of diagrams and graphs explaining magnetic attraction and torque ripples in a 4-pole wave-wound 21-slot 2-brush motor for an electric power steering assembly.
Figure 20:
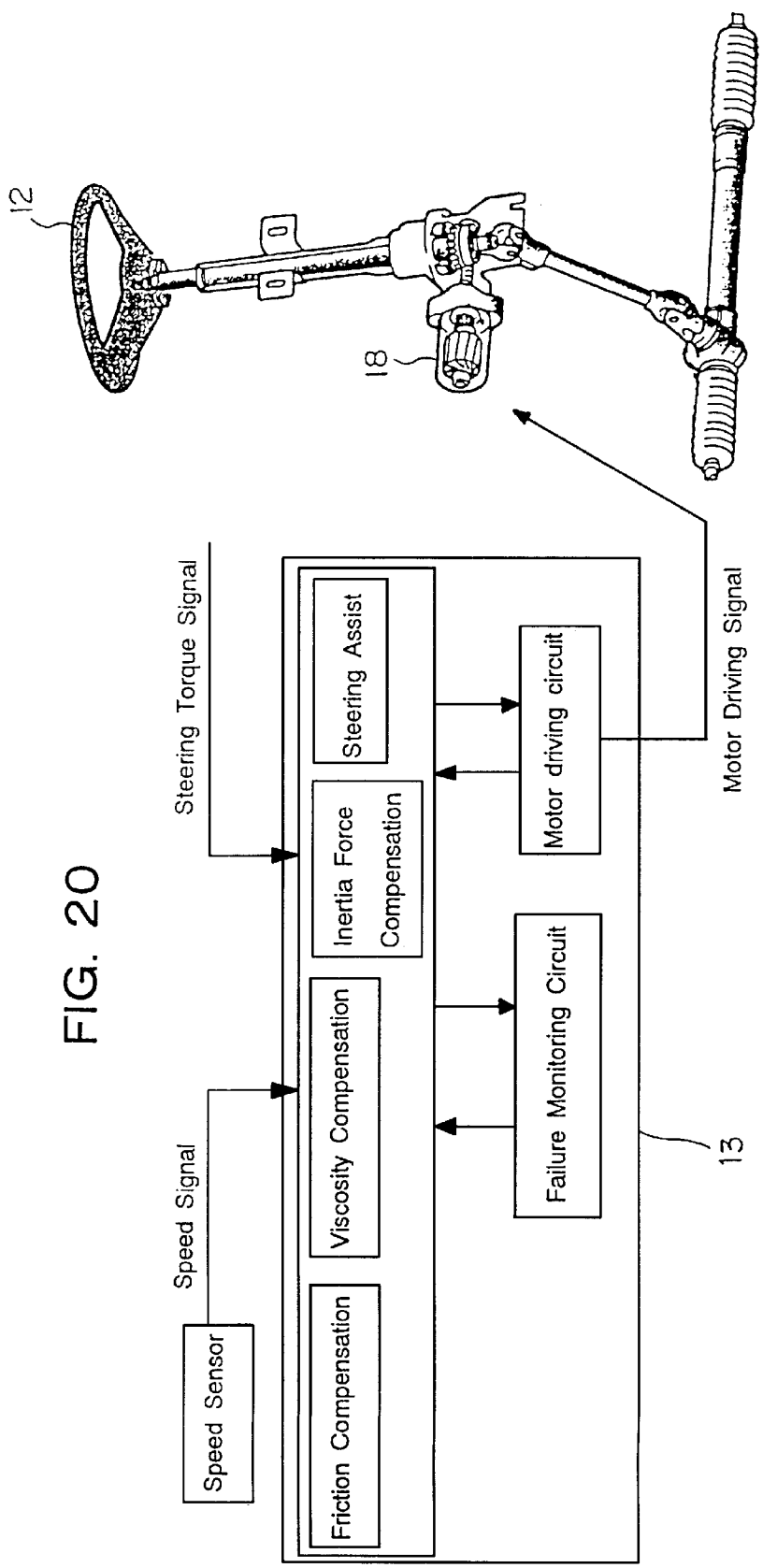
FIG. 20 is a block diagram for a control unit.

Furthermore, whereas in the case of the wave-wound armature of FIG. 19 described above, the torque ripples (p—p) represented by the ratio of vertical variance in the torque wave to the total torque are 1.37 percent, in the case of the 22-slot lap-wound armature the torque ripples (p—p) are smaller than the wave-wound case at 0.876 percent. For that reason, in an electric motor 18 driven by pulse width modulation (PWM) by means of a motor drive signal from a control unit 13 as shown in FIG. 20, the torque ripples are reduced, improving the feel of the steering wheel 12 to the driver compared with a wave-wound electric motor.

Figure 8:
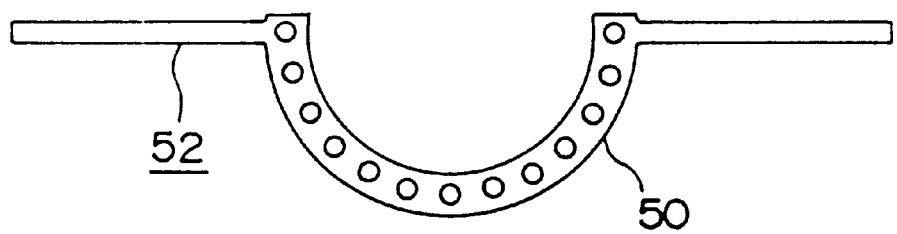
FIG. 8 is a front elevation showing another example of a terminal.

Moreover, annular terminal main bodies 28 are used in an equalizer main body 22 of the above construction, but arc-shaped terminal main bodies 50 may be used in terminals 52, as shown in FIG. 8, in order to conserve the amount of copper material used.

Figure 9:
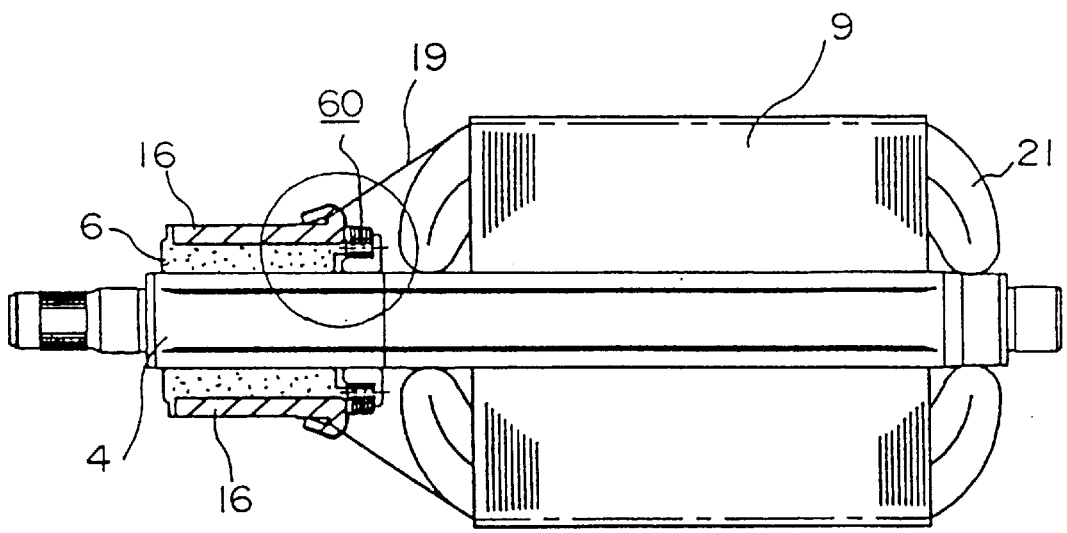
FIG. 9 is a cross-section showing another example of an armature.
Figure 10:
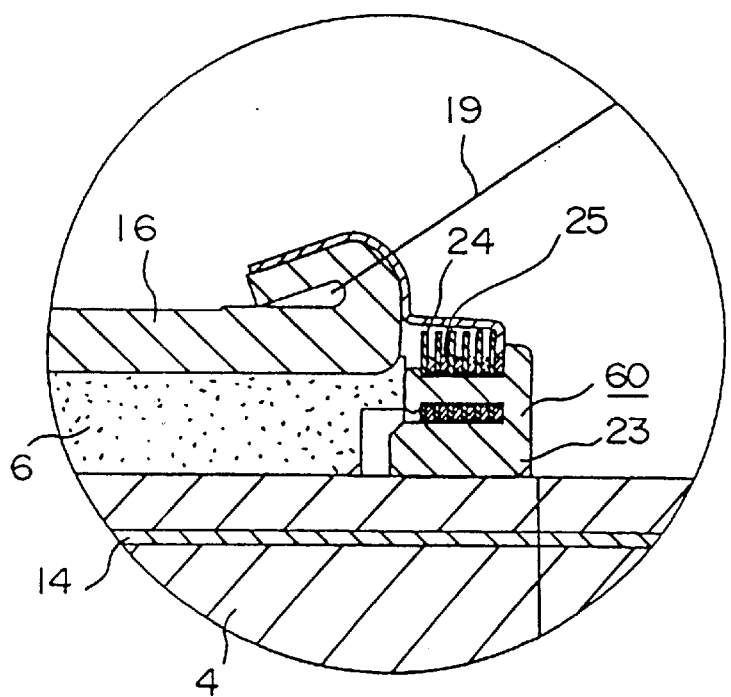
FIG. 10 is an enlargement of part of FIG. 9.

Furthermore, as shown in FIGS. 9 and 10, six terminals 24 and six insulating plates 25 of an equalizer main body 60 may be alternately stacked on the base 23 and a terminal 24 electrically connected to every second hook 34, or a terminal may be electrically connected to every third hook 34.

In order to prevent circulating currents from flowing through the brushes due to differences in the induced electromotive force arising between the circuits, the greater the number of terminals being equalizing members the greater the effect, but as explained above, the number may be reduced to allow for easier production and lower costs for the equalizer main body.

Figure 11:
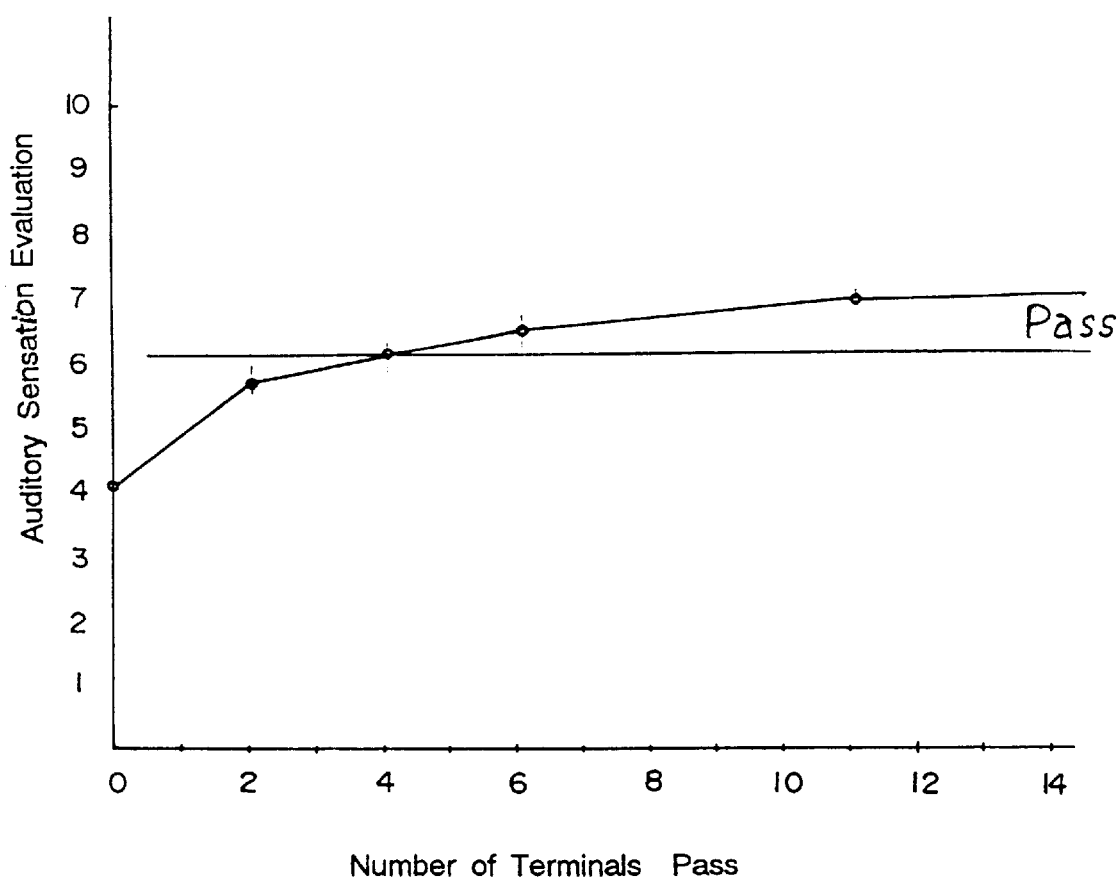
FIG. 11 is a graph showing the relationship between the number of terminals and auditory evaluation.

It was found that operating noise was smallest when the number of terminals satisfied the equation $Ns/(n \times 2) \leq K \leq Ns$, where K is the number of terminals, Ns is the number of slots in the core, and n is the maximum number of segments covered by the brushes. FIG. 11 is an evaluation for the case where Ns=22 and n=3, and the above formula satisfies the evaluation criteria, where six or more out of ten is passable.

Furthermore, in an electric motor of the above construction, machine winding of the wiring 19 of the winding 21 using enamel-coated round wire is possible in order to reduce production costs and enable mass production, but even a wiring machine cannot wind in perfect rows and there is a risk that irregularities in the resistance and inductance between circuits of the winding will increase. However, because circulating currents are prevented from flowing through the brushes due to differences in the induced electromotive force arising between the circuits by the provision of the equalizer main body 22, problems arising from irregularities in the resistance and inductance between circuits of the winding do not occur.

Furthermore, in an electric motor of the above construction, permanent field magnets 2 composed of ferrite are used in order to reduce the torque ripples most associated with steering. When the field is generated by electromagnets, the magnetic flux density is generally higher than that of permanent magnets, intensifying the changes in flux density in the gap as the slots and the teeth of the core alternately face the poles due to changes in position in the direction of rotation of the armature, thereby increasing torque ripples. Whereas the average flux density in the gap in the case of permanent ferrite field magnets is normally approximately 0.3 to 0.4 Tesla, it is approximately double in the case of electromagnets at 0.7 to 0.8 Tesla, and in the case of electromagnets, torque ripples increase, fluctuations in magnetic attraction also increase at the teeth of the core, and electromagnetic noise also increases. Furthermore, when permanent ferrite field magnets are used, it becomes possible to reduce the size of the motor, simplify the assembly operation, and reducing costs.

Thus, it is effective to use permanent ferrite field magnets in an electric motor, but in that case, since the magnetic flux density of the field is low, it is necessary to increase the number of winds of the wiring in the armature to ensure torque quality. For that reason, the field magnets are greatly affected by the reaction from the armature, and the magnetic center of the flux distribution of the magnetic field poles is shifted greatly in the opposite direction to the rotational direction of the armature. In an ordinary motor, this shift in magnetic center is compensated for by offsetting the brushes from the geometric center of the magnetic poles in the opposite direction to the rotational direction of the armature to obtain a good flux distribution. However, because this electric motor rotates in both directions, it is not possible to compensate for shifts in magnetic center by offsetting the brushes in the opposite direction to the rotational direction of the armature in order to obtain a good flux distribution.

Consequently, in this electric motor, good flux distribution is ensured by improving the balance of the induced voltage in each of the circuits of the winding by providing an equalizer main body 22 on the armature 20 in order to compensate for poor flux distribution, and the special effects described below are obtained.

Figure 12:
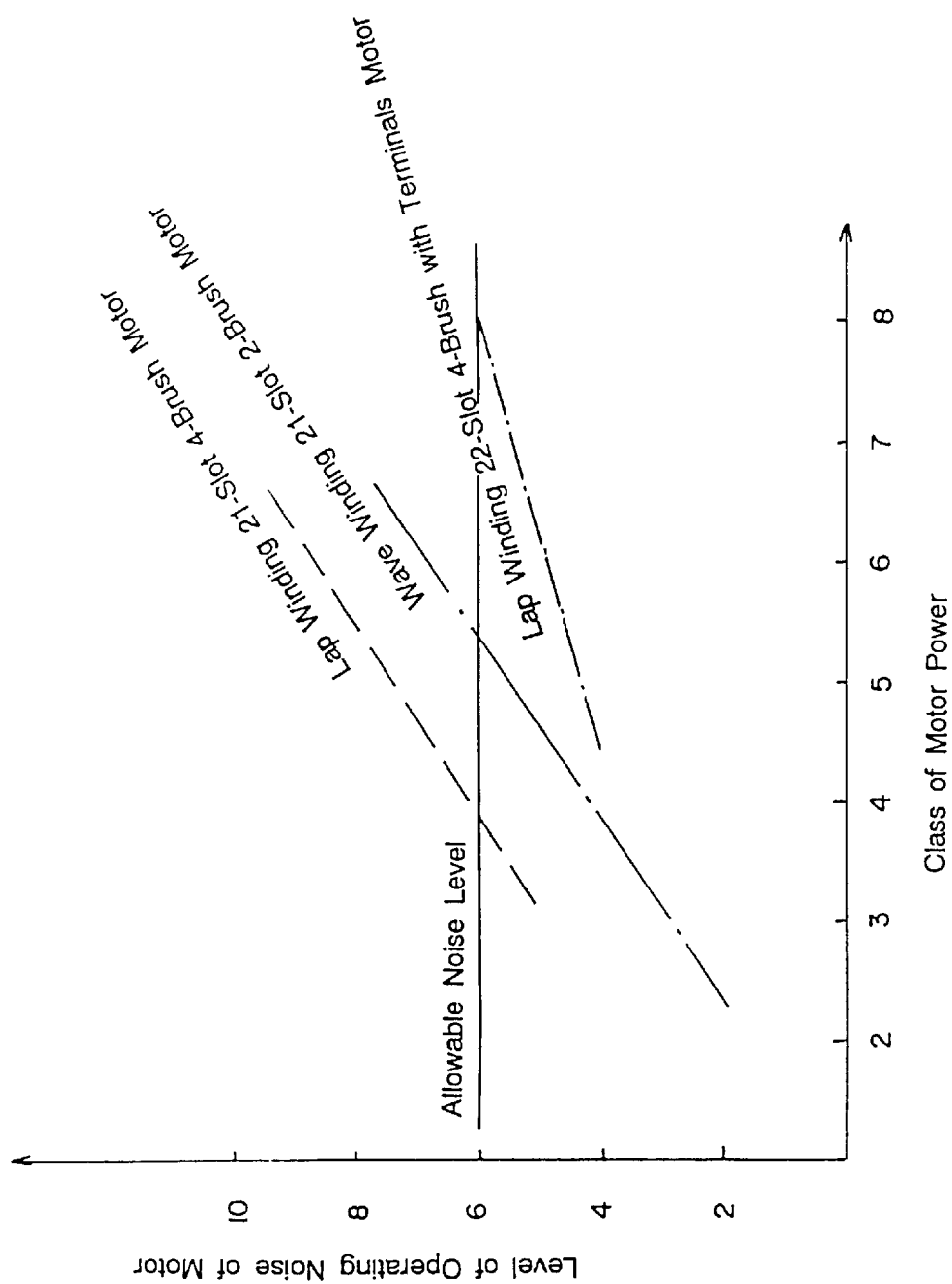
FIG. 12 is a graph showing the relationship between motor output class and motor operating noise for various types of motor.
Figure 13:
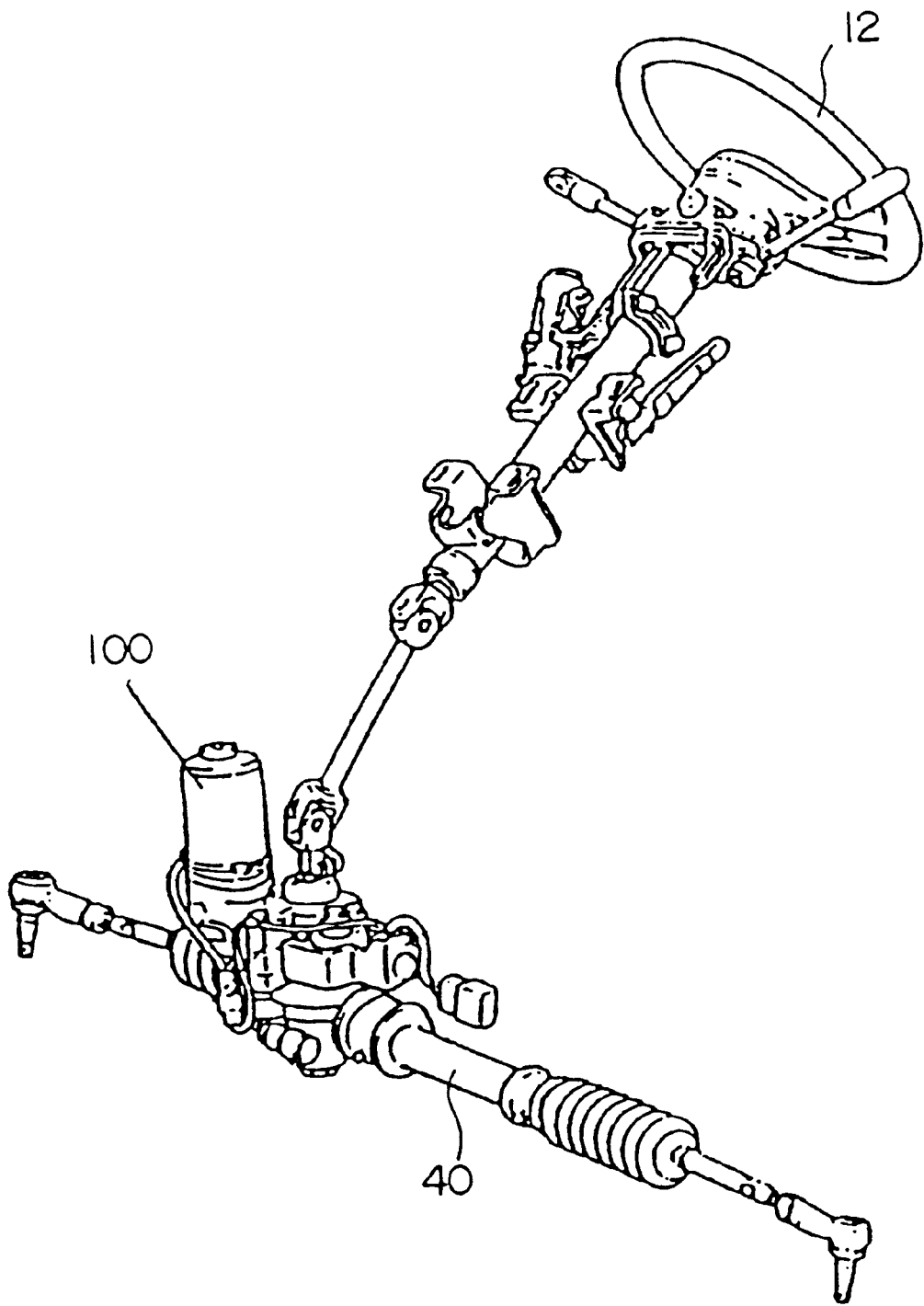
FIG. 13 is a perspective view showing a motor for an electric power steering assembly mounted on a pinion.

(1) Because the operating noise of this electric motor is reduced as shown in FIG. 12, the driver does not notice any unpleasant operating noise while steering, even if this electric motor is mounted on the steering column. Moreover, since this electric motor can be mounted on the column within the automobile cabin, it is placed in a more advantageous environment with respect to heat and water than a conventional electric motor 100 which is mounted, for example, on a rack 40 in the engine compartment as shown in FIG. 13, enabling this electric motor to be manufactured more cheaply.

(2) Because this electric motor adopts a lap-wound 4-brush method, torque ripples can be reduced, and even if this motor is driven by pulse width modulation (PWM) by means of a motor drive signal from a control unit 13, vibrations transmitted to the steering wheel 12 during activation of this electric motor are practically nonexistent, preventing deterioration of the feel of the steering wheel to the driver.

Furthermore, because torque ripples are reduced in this electric motor, the degree of freedom in designing the PWM driving method of the control unit 13 is increased, allowing improvements in responsiveness and microcurrent control to be introduced, further improving the feel of the steering wheel.

Furthermore, holding noise (the noise generated by vibrations caused by an electric motor caused by changes in torque due to changes in the current flowing through the armature resulting from minute changes in the contact between the brushes 8 and the segments 16 when the steering wheel 12 is held in a given position; or the vibrating noise generated in the period of minute displacement due to backlash from the system when an electric motor is not active) can be reduced.

Figure 14:
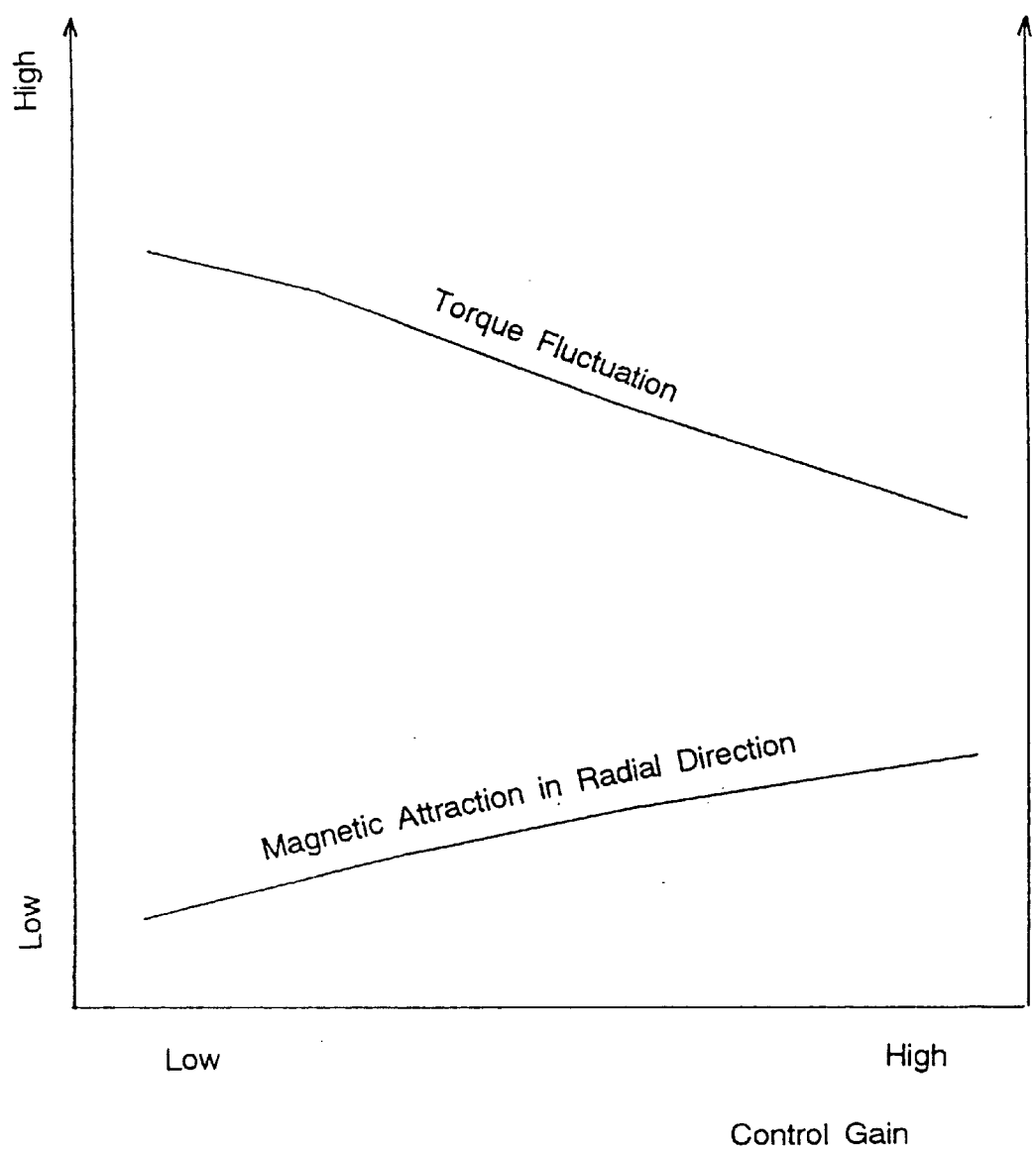
FIG. 14 is a graph showing the relationships between control gain, fluctuation in torque, and magnetic attraction in a radial direction.
Figure 15:
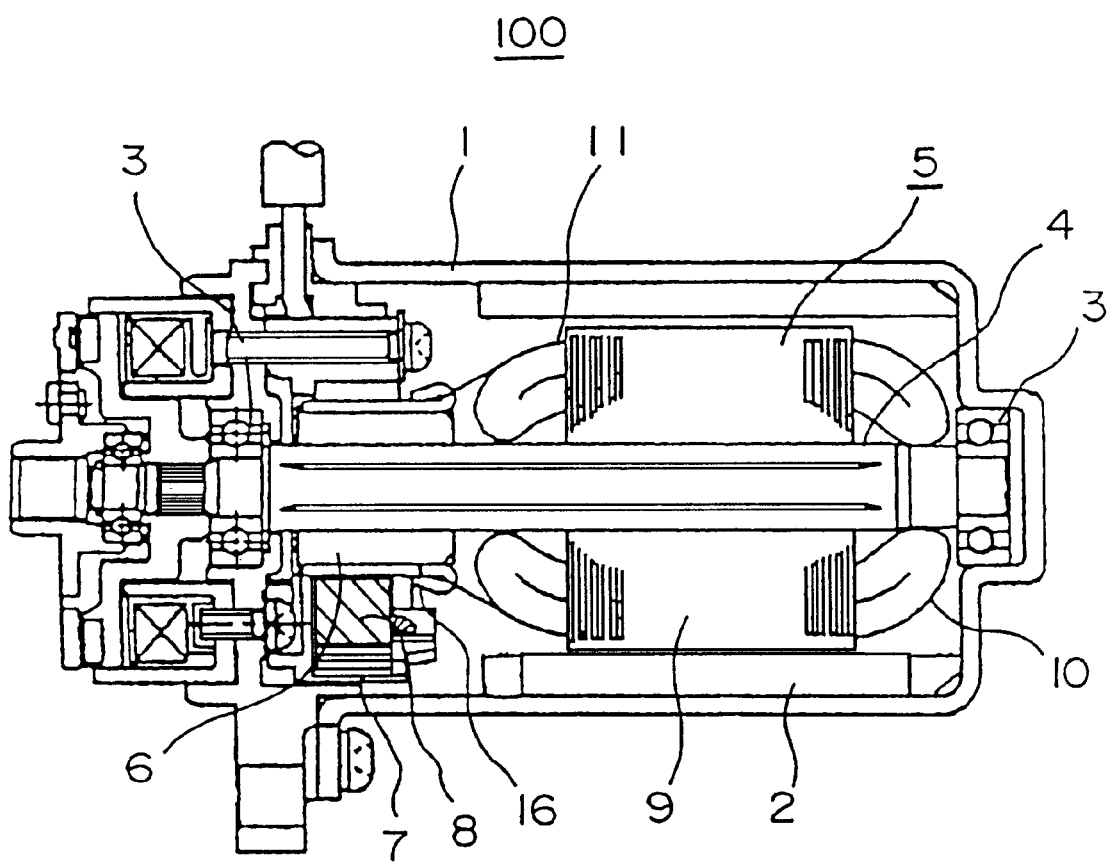
FIG. 15 is a cross-section of a conventional motor for an electric power steering assembly.
Figure 16:
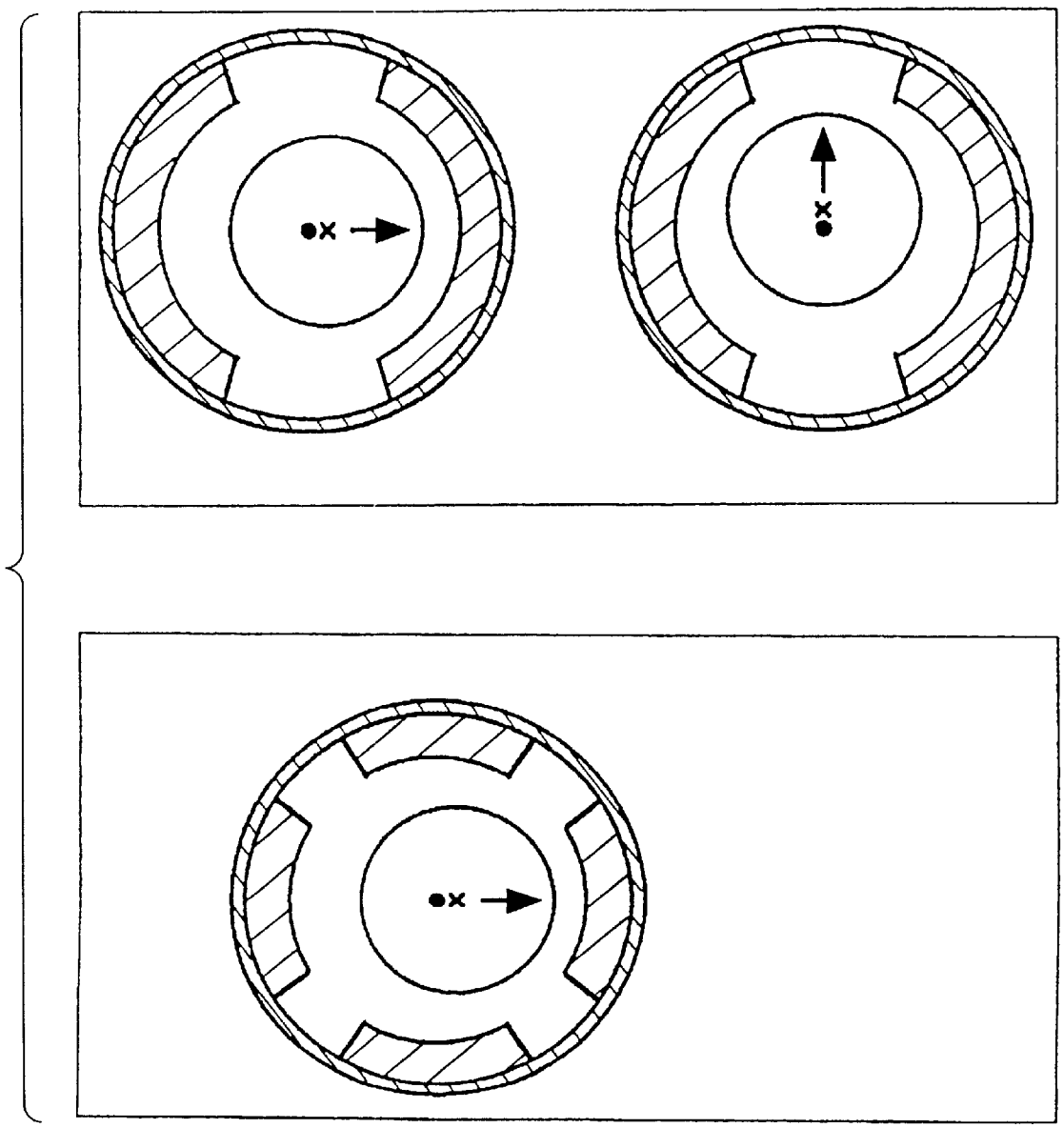
FIG. 16 is a set of diagrams explaining magnetic attraction in a 2-pole motor and in a 4-pole motor.
Figure 17:
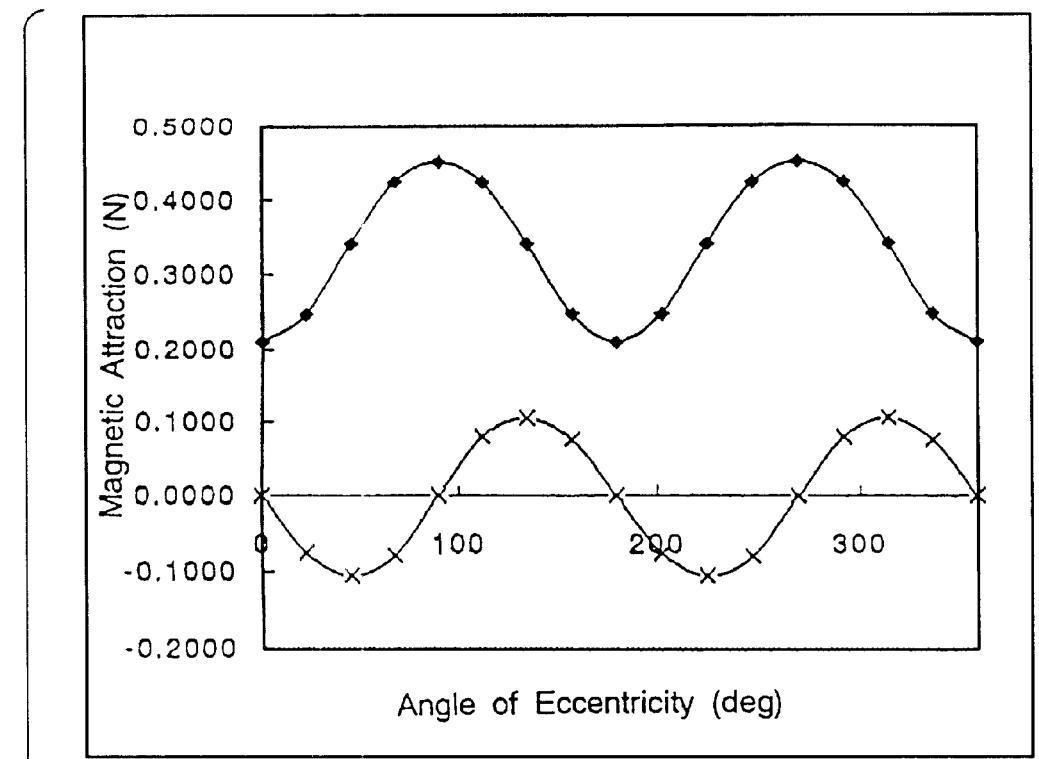
FIG. 17 is a set of graphs explaining magnetic attraction in a 2-pole motor and in a 4-pole motor.
Figure 17:
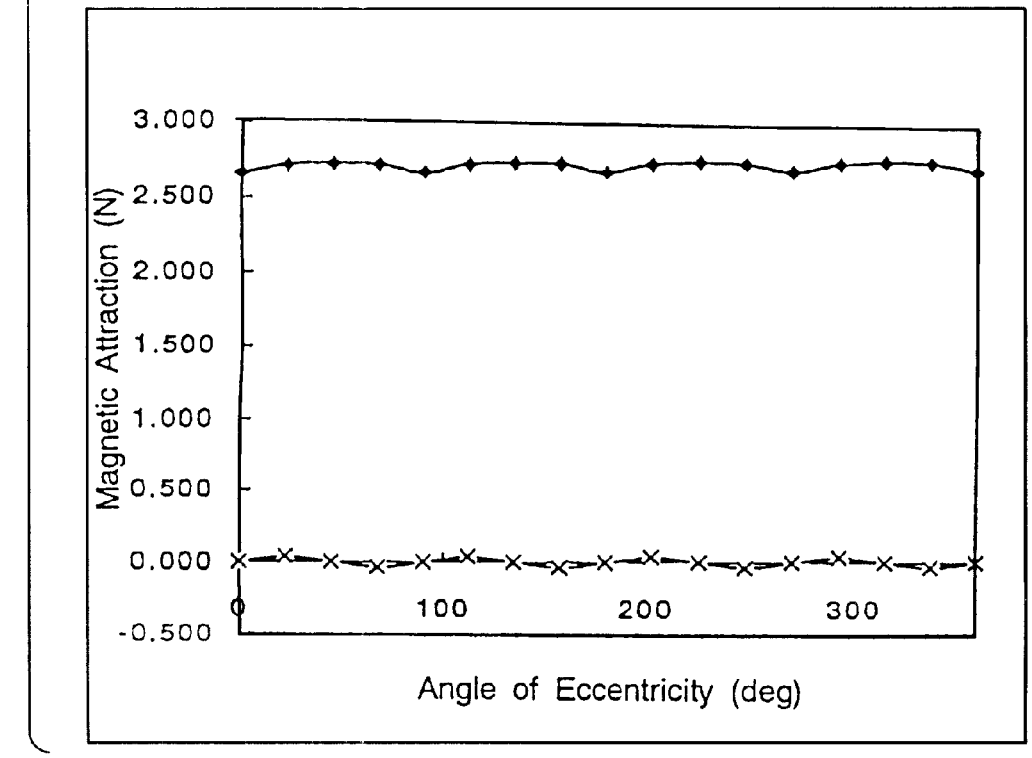

In a conventional wave-wound 2-brush method, torque ripples are large and holding noise is easily generated, but when attempts are made to suppress the generation of this holding noise by means of the control unit 13 by increasing control gain, torque fluctuations indicating the degree of holding noise are reduced as shown in FIG. 14, while operating noise (magnetic attraction in the radial direction) is increased, and it is not possible to suppress both holding noise and operating noise simultaneously. On the other hand, in this electric motor employing a lap-wound 4-brush method, it is possible to suppress both holding noise and operating noise simultaneously.

(3) Because this electric motor adopts a lap-wound 4-brush method, the current density in the brushes 8 can be reduced, enabling the allowable current-bearing time of this electric motor to be lengthened. During reverse parking, U-turns, etc., the steering wheel 12 is frequently turned to its maximum angle and used in a so-called "stationary steering" or "end locked" state, but at that time the armature of an electric motor hardly rotates at all while torque is still being generated, and the electric motor is used in a constrained state. This electric motor allows the current density in the brushes 8 to be reduced at that time, when temperature increases are harshest, enabling the allowable period of use in a "stationary steering" or "end locked" state to be lengthened, thereby increasing the utility of the electric motor.

Furthermore, the working life of the brushes 8 is lengthened thereby, improving the reliability and durability of the electric motor.

(4) Because this electric motor adopts a lap-wound 4-brush method, the cross-sectional area of the wiring in the winding 21 can be approximately half that of a wave winding under identical conditions, facilitating shaping of the wire and improving winding, and because the diameter of the wire is small, there are fewer gaps between portions of the wiring within the slots 11 of the core 9, improving the wire-to-space ratio and enabling the size of the electric motor to be reduced. Consequently, the moment of inertia and torque loss of the armature 20 which are important factors in steering can be reduced.

(5) By improving the balance of the induced voltage between each of the circuits of the winding, an overall reduction in torque ripples can be achieved, reducing the torque ripples transmitted to the steering wheel, and enabling an overall improvement in the feel of the steering wheel to the driver.

(6) Because this electric motor provides a good commutating action, in addition to enabling effects such as the lengthening of the working life of the brushes 8, the suppression of temperature increases in the brushes 8, and the reduction of commutator noise (spark noise) in the brushes 8, it is advantageous with respect to radio noise, etc., because the generation of sparks is reduced. In particular, when mounted on the steering column where use in close proximity to radio power circuitry, etc., cannot be avoided, the effects on radio noise, etc., are small.

Furthermore, because the generation of sparks is reduced, the load of the springs 7 pressing the brushes 8 against the commutator 6 can be reduced, enabling the reduction of torque loss due to brush pressure, and also enabling the reduction of frictional heat due to the pressure of the brushes 8. Consequently, even though this electric motor adopts a lap-wound 4-brush method, torque loss can be maintained at the same level as that of a wave-wound 2-brush method.

Moreover, the above embodiment was explained for 4-pole 24- and 22-slot lap-wound motors for electric power steering assemblies, but the number of slots is not limited to these numbers, and provided that the number of slots is an even number which does not give rise to magnetic attraction in the radial direction relative to the armature, the noise reduction effect will be realized.

Additionally, provided that the number of slots is not a multiple of the number of poles, torque ripples can also be reduced.

Figure 22:
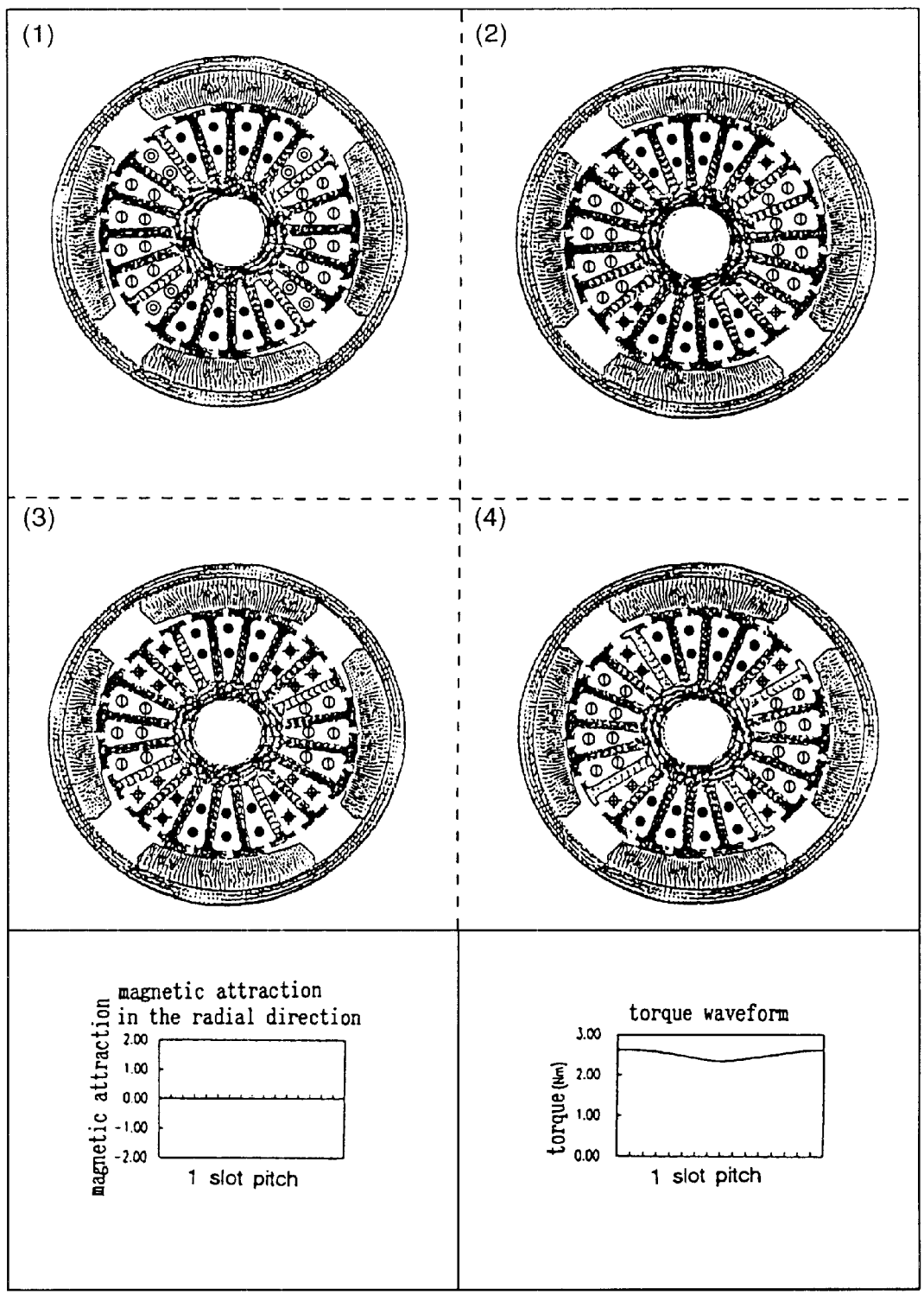
FIG. 22 is a set of diagrams and graphs explaining magnetic attraction and torque ripples in a 4-pole lap-wound 20-slot 4-brush motor for an electric power steering assembly.
Figure 23:
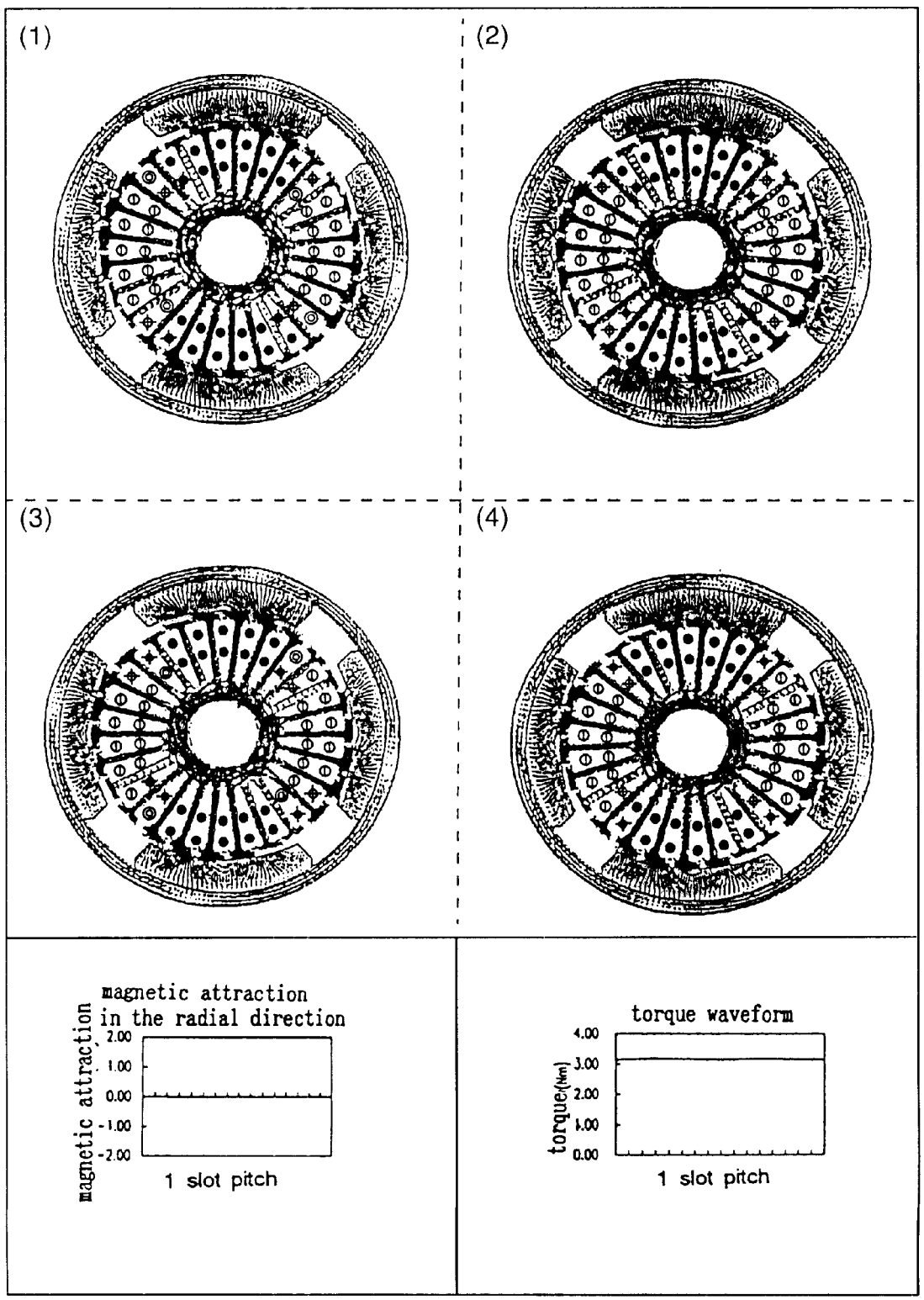
FIG. 23 is a set of diagrams and graphs explaining magnetic attraction an torque ripples in a 4-pole lap-wound 26-slot 4-brush motor for an electric power steering assembly.
Figure 24:
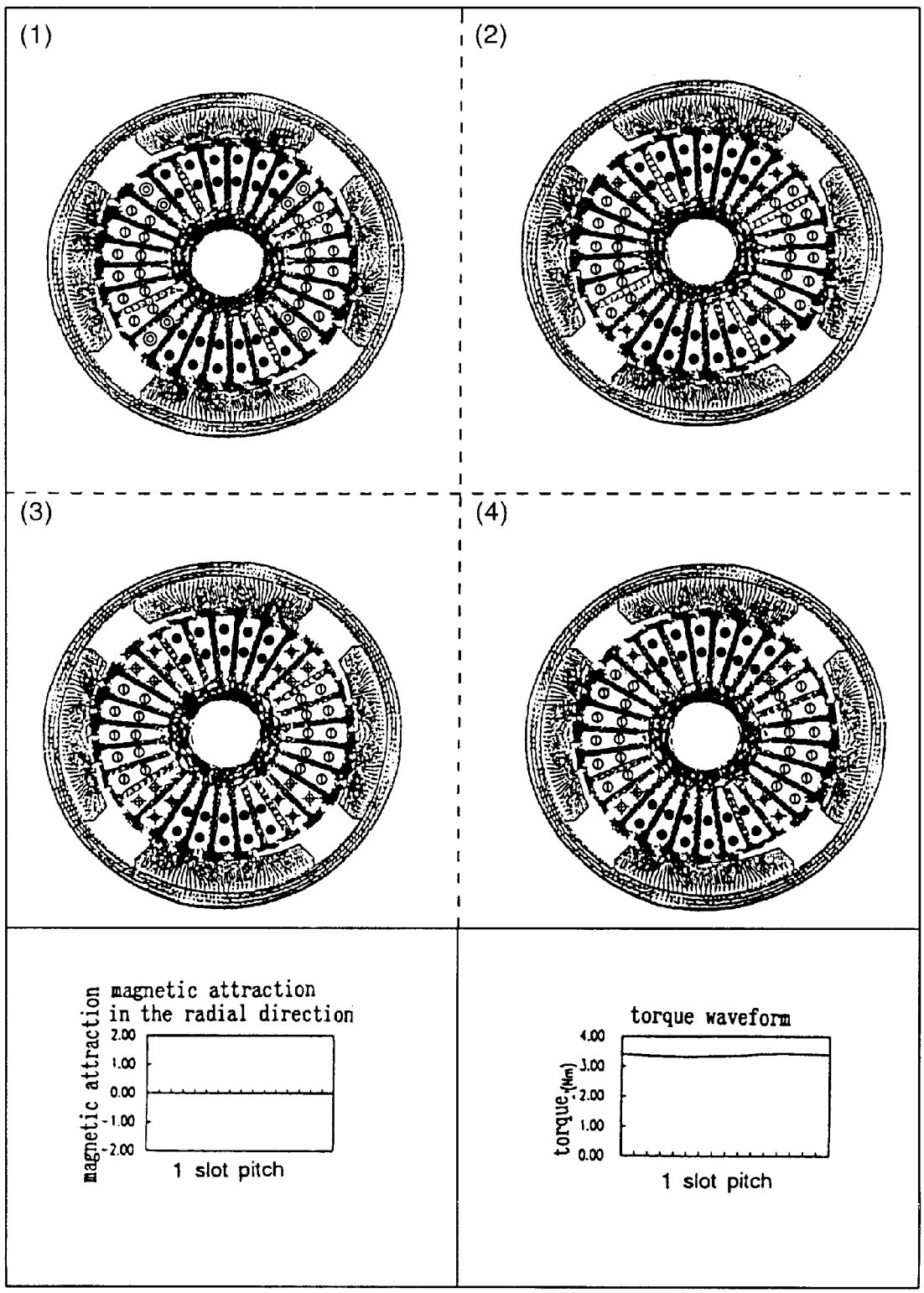
FIG. 24 is a set of diagrams and graphs explaining magnetic attraction and torque ripples in a 4-pole lap-wound 28-slot 4-brush motor for an electric power steering assembly.

FIGS. 22 to 24 show the magnetic attraction and torque ripples acting on an armature in the cases of 4-pole 20-slot, 4-pole 26-slot, and 4-pole 28-slot lap windings, and it is clear that magnetic attraction does not act in the radial direction in any of these cases. FIG. 25 summarizes these results, and it can be seen that magnetic attraction does not occur in the radial direction when the number of slots chosen is an even number or a multiple of the number of pairs of poles, and that torque ripples can be reduced if the number of slots is not a multiple of the number of poles.

Furthermore, the number of poles is not limited to four, and may be any number from four upwards, such as six, eight, etc. FIGS. 26 to 31 show examples of 6-pole 25-slot, 6-pole 24-slot, 6-pole 22-slot, 6-pole 26-slot, 6-pole 21-slot, and 6-pole 27-slot lap windings.

Figure 26:
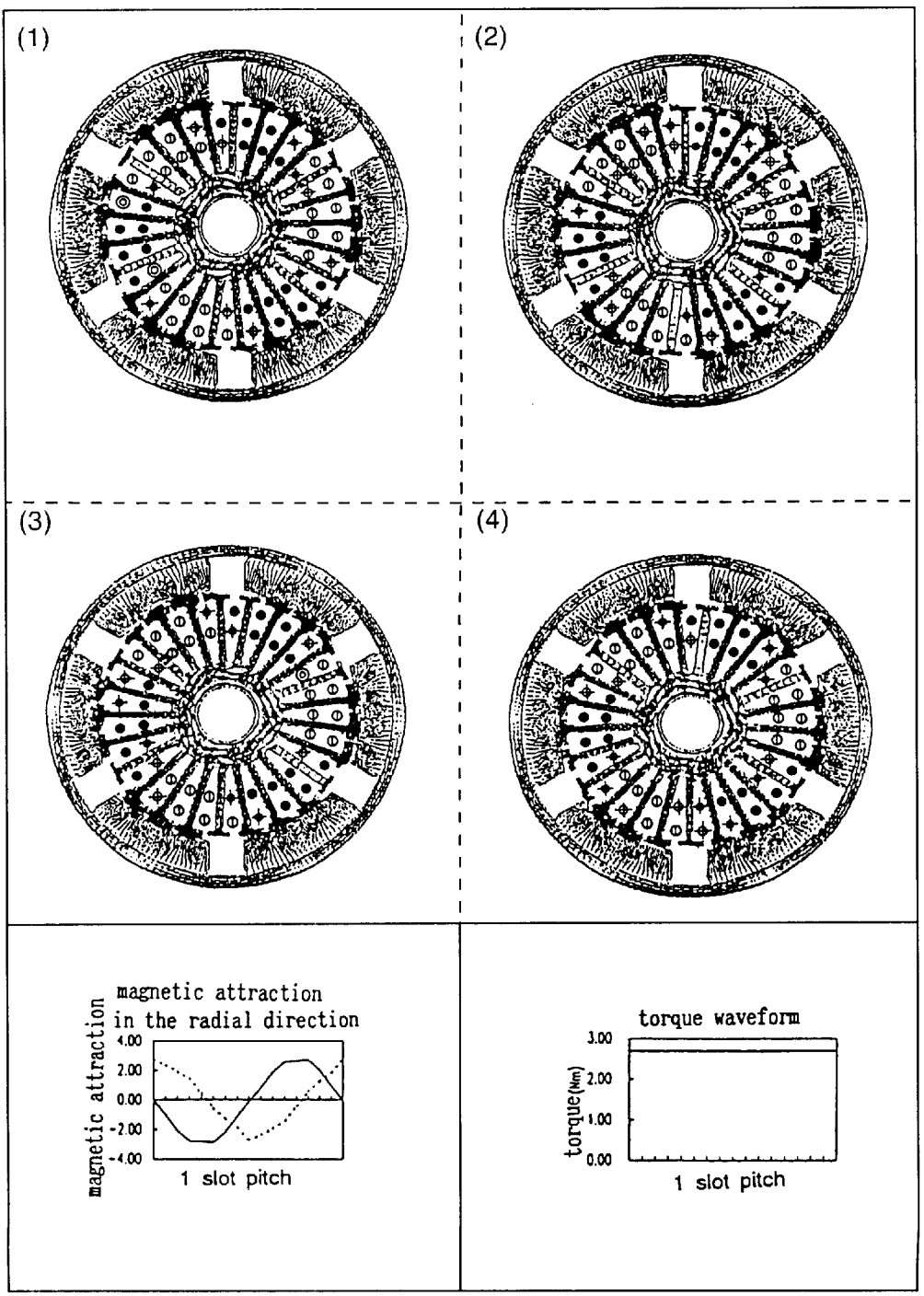
FIG. 26 is a set of diagrams and graphs explaining magnetic attraction and torque ripples in a 6-pole lap-wound 25-slot 6-brush motor for an electric power steering assembly.
Figure 27:
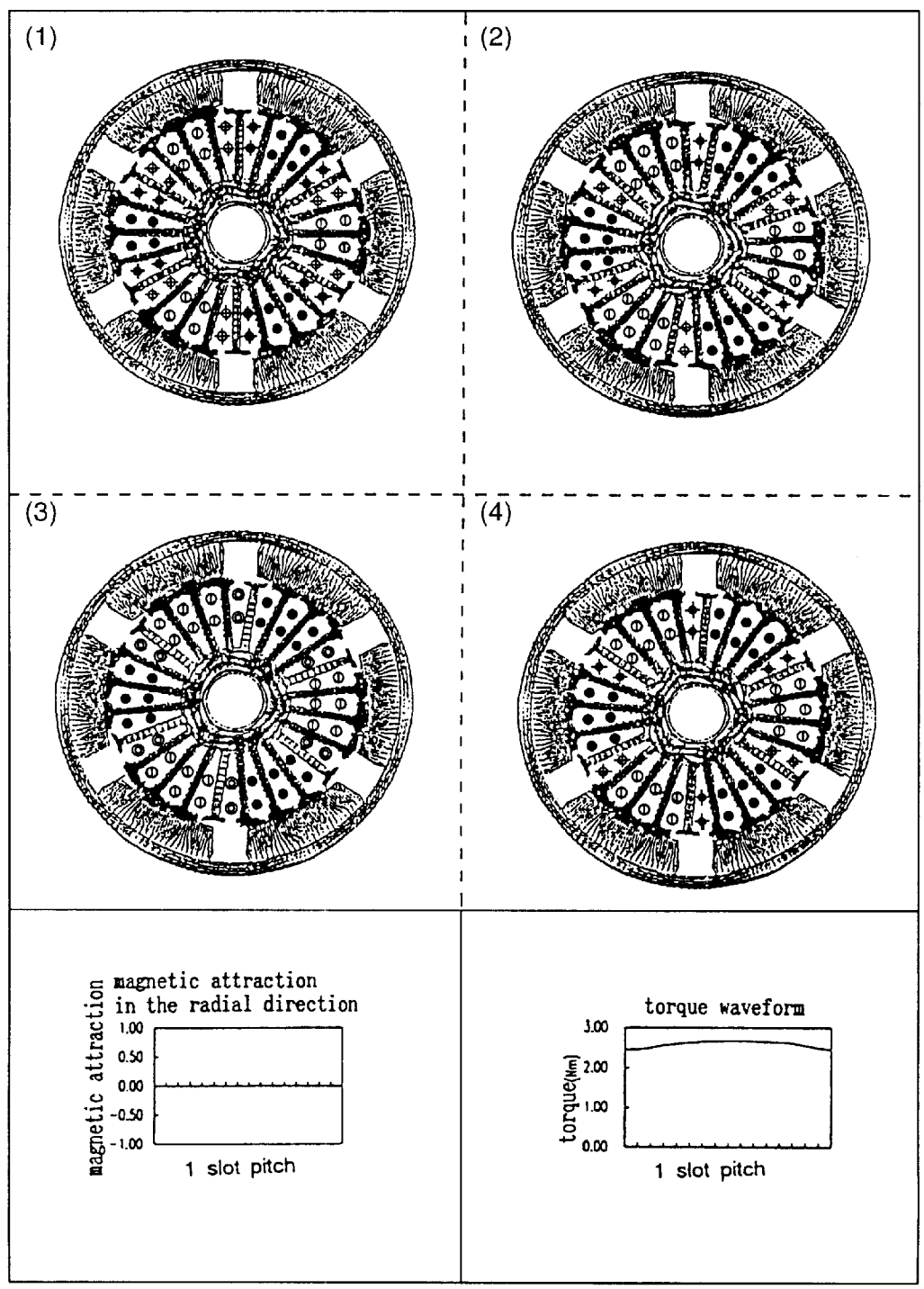
FIG. 27 is a set of diagrams and graphs explaining magnetic attraction and torque ripples in a 6-pole lap-wound 24-slot 6-brush motor for an electric power steering assembly.
Figure 28:
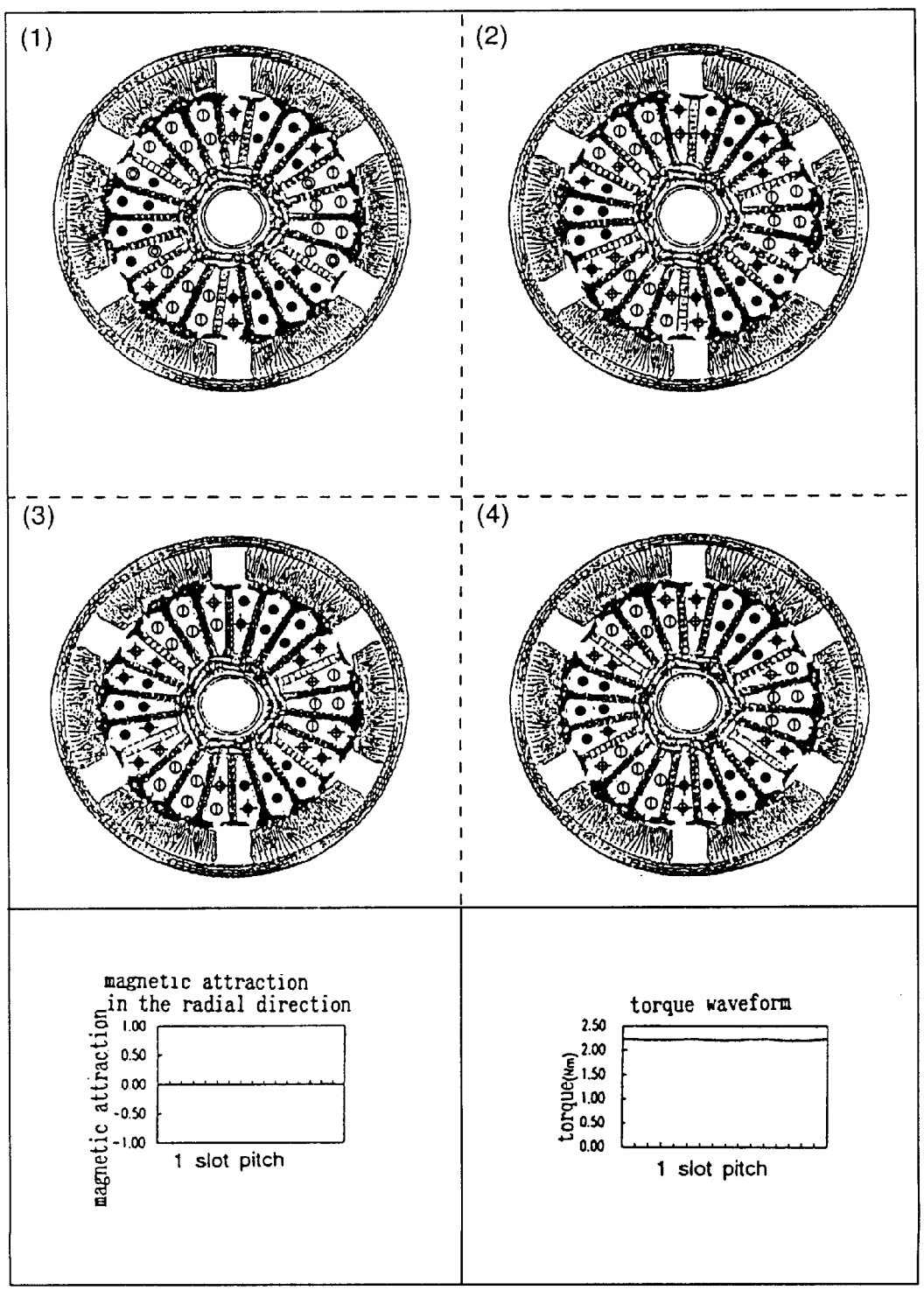
FIG. 28 is a set of diagrams and graphs explaining magnetic attraction and torque ripples in a 6-pole lap-wound 22-slot 6-brush motor for an electric power steering assembly.
Figure 29:
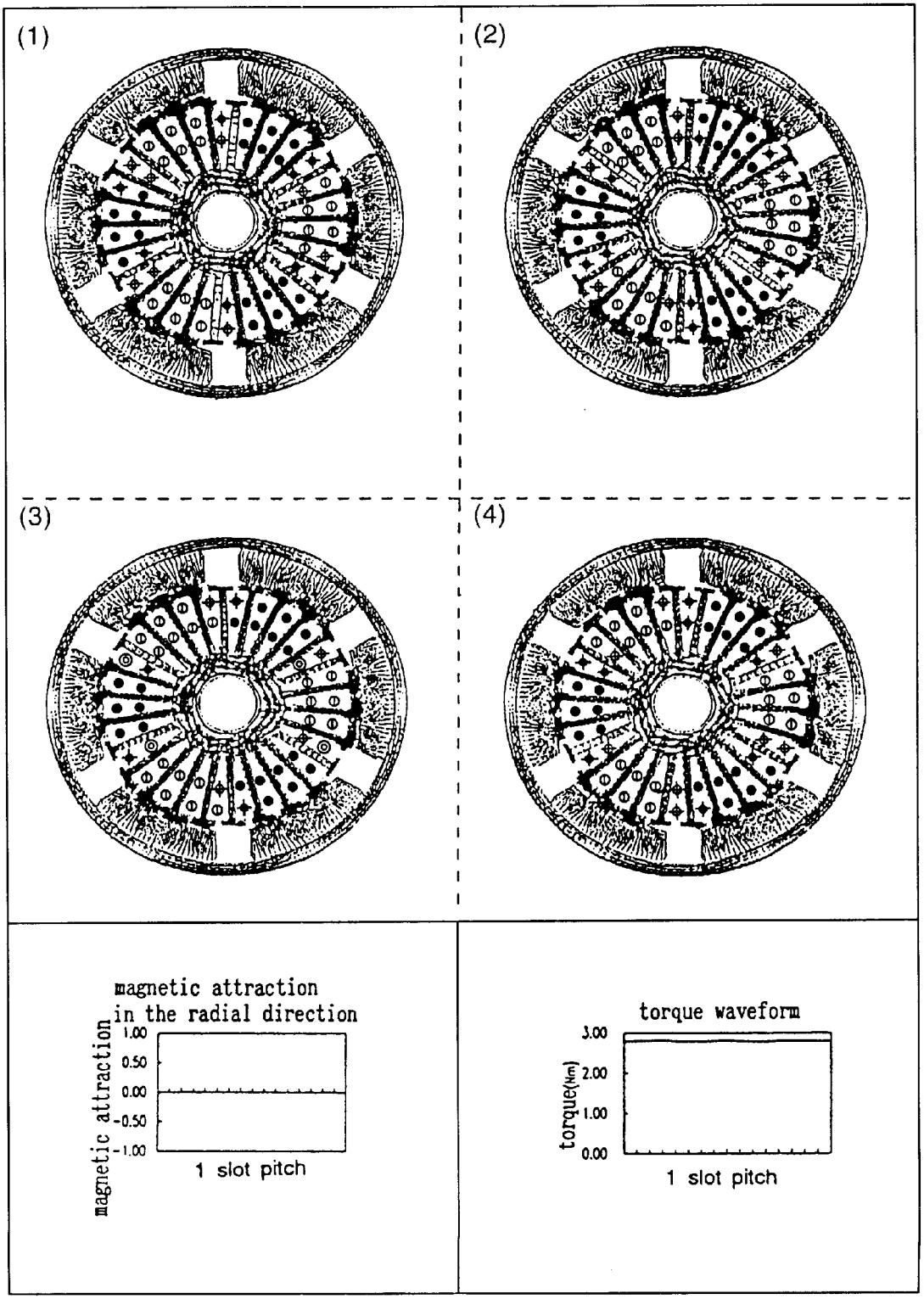
FIG. 29 is a set of diagrams and graphs explaining magnetic attraction and torque ripples in a 6-pole lap-wound 26-slot 6-brush motor for an electric power steering assembly.
Figure 30:
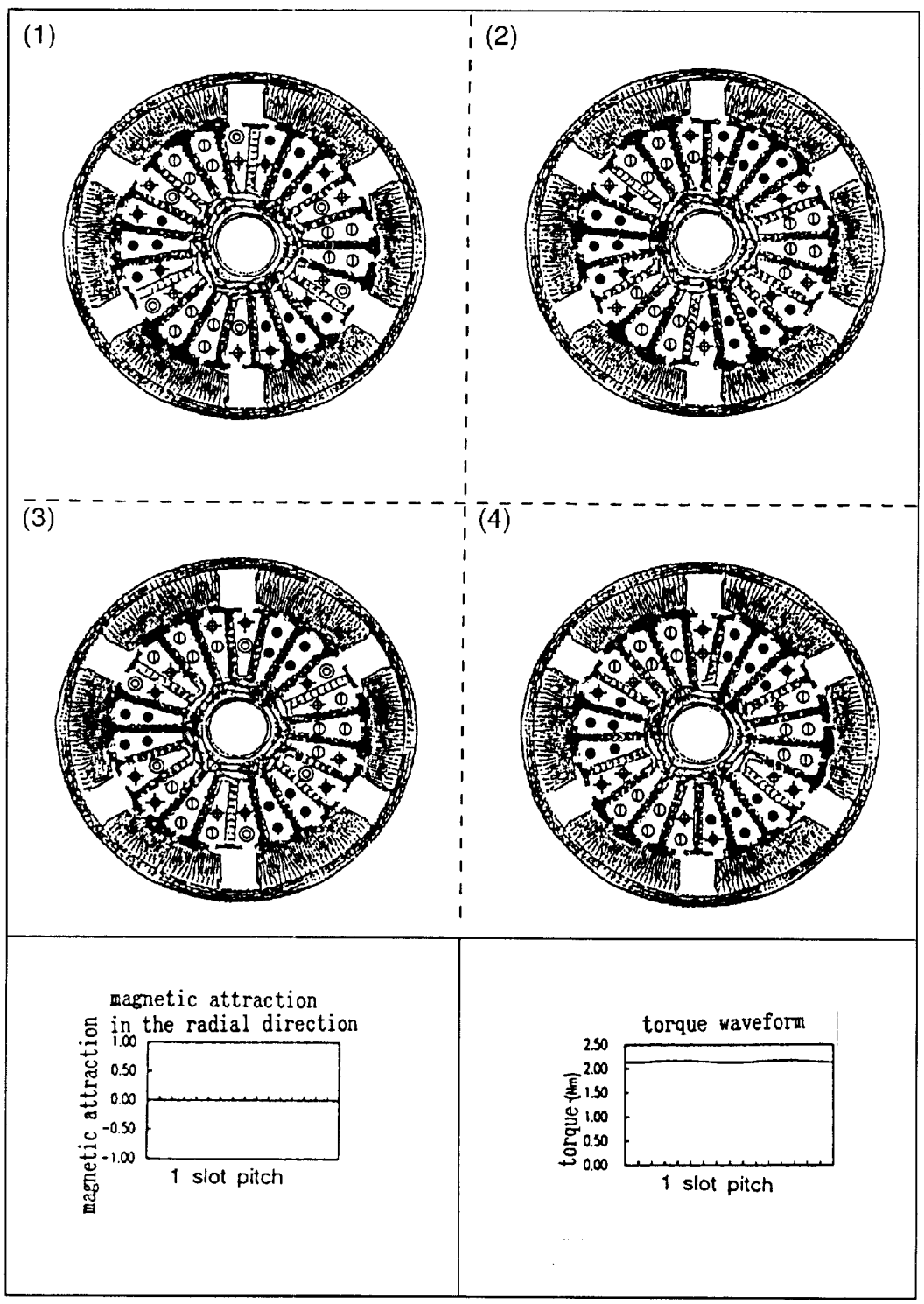
FIG. 30 is a set of diagrams and graphs explaining magnetic attraction and torque ripples in a 6-pole lap-wound 21-slot 6-brush motor for an electric power steering assembly.
Figure 31:
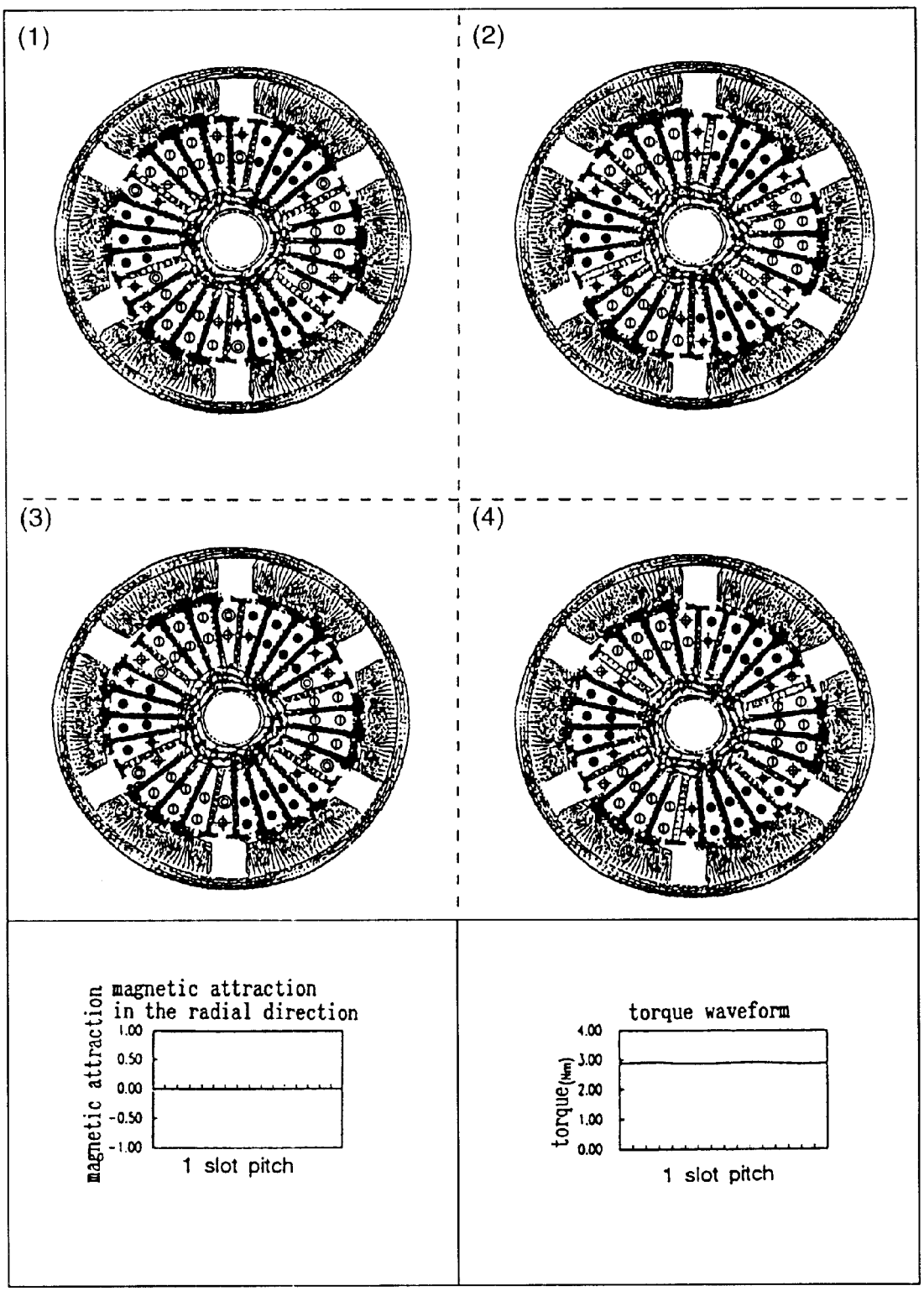
FIG. 31 is a set of diagrams and graphs explaining magnetic attraction and torque ripples in a 6-pole lap-wound 27-slot 6-brush motor for an electric power steering assembly.

From FIG. 26, it can be seen that magnetic attraction acts in the radial direction because the number of slots is neither an even number nor a multiple of the number of pairs of poles. In FIG. 27, the torque ripples are large because the number of slots is a multiple of the number of poles. In FIGS. 28 and 29, the number of slots is an even number but not a multiple of the number of poles, and in FIGS. 30 and 31, the number of slots is a multiple of the number of pairs of poles but not a multiple of the number of poles, and so magnetic attraction does not act in the radial direction in any of these cases, and torque ripples are minimized. FIG. 32 summarizes these results, and as with the 4-pole cases, it can be seen that magnetic attraction does not occur in the radial direction if the number of slots is an even number or a multiple of the number of pairs of poles, and that torque ripples can be reduced if the number of slots is not a multiple of the number of poles. The same applies to cases with eight poles or more. When the number of slots is a multiple of the number of pairs of poles, the equalizing members described above can be provided, enabling circulating current to be prevented and the commutating action to be improved.

As explained above, according to one aspect of the present invention, there is provided a motor for an electric power steering assembly comprising: a yoke; a multi-polar magnetic field portion composed of at least four poles secured to the inner wall of the yoke; a shaft disposed within the yoke so as to be able to rotate freely; an armature secured to the shaft having a winding constructed by lap winding wiring into an even number of slots formed on the outer circumferential surface of a core so as to extend in the axial direction thereof; a commutator comprising a plurality of segments secured to an end portion of the shaft; and a plurality of brushes contacting the surface of the commutator, whereby the total magnetic attraction acting on the armature is zero and rotational vibrations which cause operating noise do not arise, thereby enabling operating noise to be reduced.

According to one form of the present invention, there is provided a motor for an electric power steering assembly wherein the number of slots is even and is not a multiple of the number of poles, enabling operating noise to be reduced, as well as reducing torque ripples and improving the feel of the steering wheel to the driver.

According to another aspect of the present invention, there is provided a motor for an electric power steering assembly comprising: a yoke; a multi-polar magnetic field portion composed of at least four poles secured to the inner wall of the yoke; a shaft disposed within the yoke so as to be able to rotate freely; an armature secured to the shaft having a winding constructed by lap winding wiring into a number of slots being a multiple of the number of pairs of poles, the slots being formed on the outer circumferential surface of a core so as to extend in the axial direction thereof; a commutator comprising a plurality of segments secured to an end portion of the shaft; and a plurality of brushes contacting the surface of the commutator, whereby the total magnetic attraction acting on the armature is zero and rotational vibrations which cause operating noise do not arise, thereby enabling operating noise to be reduced.

According to one form of the present invention, there is provided a motor for an electric power steering assembly wherein the number of slots is a multiple of the number of pairs of poles and is not a multiple of the number of poles, enabling operating noise to be reduced, as well as reducing torque ripples and improving the feel of the steering wheel to the driver.

According to one another form of the present invention, the circuits of the armature are electrically connected to each other using equalizing members, enabling the prevention of circulating currents from flowing through the brushes due to differences in induced electromotive forces arising between the circuits of the armature, thereby enabling the commutating action of the brushes to be improved, and also enabling the suppression of commutator sparks generated by the brushes. Furthermore, the magnitudes of both operating noise and torque ripples can be reduced thereby.

According to still another form of the present invention, there is provided a motor for an electric power steering assembly wherein the number of equalizing members is determined by $Ns/(n\times 2) \leq K \leq Ns$, where K is the number of equalizing members, Ns is the number of slots in the core, and n is the maximum number of segments covered by the brushes, enabling the appropriate number to be determined, thereby enabling the elimination of excess.

According to one form of the present invention, there is provided a motor for an electric power steering assembly wherein the current passing through the winding is controlled by pulse width modulation (PWM) driving, whereby the desired voltage can be applied with reduced output loss, and the size of the control unit can be reduced.

According to another form of the present invention, there is provided a motor for an electric power steering assembly wherein the wiring is enamel-coated round wire, facilitating the mechanization of the step of winding the wiring onto the core, thereby enabling mass production of the armature and reducing production costs.

According to still another form of the present invention, there is provided a motor for an electric power steering assembly wherein the magnetic field portion comprises a plurality of permanent magnets disposed so as to be spaced around the inner wall of the yoke, enabling the magnitude of torque ripples to be reduced. Reductions in size, improvements in the assembly operation, and cost reductions are also enabled.

What is claimed is:

1. A motor for an electric power steering assembly comprising:

a yoke;

a multi-polar magnetic filed portion composed of at least four poles secured to an inner wall of said yoke;

a shaft disposed within said yoke so as to be able to rotate freely;

an armature secured to said shaft having a winding constructed by lap winding a wiring into a number of slots being an integer multiple of the number of pairs of said poles and being not an integer multiple of the number of said poles, said slots being formed on an outer circumferential surface of a core so as to extend in the axial direction thereof;

a commutator comprising a plurality of segments secured to an end portion of said shaft; and a plurality of brushes contacting a surface of said commutator.

2. The motor for an electric power steering assembly according to claim 1, wherein the number of said poles is four and the number of said slots is twenty-two.

3. The motor for an electric power steering assembly according to claim 1, wherein the number of said poles is four and the number of said slots is twenty-six.

4. The motor for an electric power steering assembly according to claim 1, wherein the number of said poles is six and the number of said slots is twenty-one.

5. The motor for an electric power steering assembly according to claim 1, wherein the number of said poles is six and the number of said slots is twenty-seven.

* * * * *